US011927056B2

(12) United States Patent
Vande Haar

(10) Patent No.: US 11,927,056 B2
(45) Date of Patent: Mar. 12, 2024

(54) RETRACTABLE SCREEN SYSTEM AND FENESTRATION ASSEMBLY

(71) Applicant: Pella Corporation, Pella, IA (US)

(72) Inventor: Evan E. Vande Haar, Pella, IA (US)

(73) Assignee: Pella Corporation

( * ) Notice: Subject to any disclaimer, the term of this patent is extended or adjusted under 35 U.S.C. 154(b) by 560 days.

(21) Appl. No.: 17/084,446

(22) Filed: Oct. 29, 2020

(65) Prior Publication Data

US 2021/0131177 A1 May 6, 2021

Related U.S. Application Data

(60) Provisional application No. 62/927,799, filed on Oct. 30, 2019.

(51) Int. Cl.
*E06B 9/54* (2006.01)
*E06B 9/52* (2006.01)

(52) U.S. Cl.
CPC .......... *E06B 9/54* (2013.01); *E06B 2009/527* (2013.01); *E06B 2009/528* (2013.01)

(58) Field of Classification Search
CPC ................. E06B 9/54; E06B 2009/527; E06B 2009/528; E06B 9/581; E06B 2009/543; E06B 2009/546; E06B 3/4415; E06B 2003/4492
See application file for complete search history.

(56) References Cited

U.S. PATENT DOCUMENTS

| | | | |
|---|---|---|---|
| 1,114,990 A | 10/1914 | Hutchinson | |
| 5,301,734 A | 4/1994 | Opel | |
| 5,363,898 A | 11/1994 | Sprague | |
| 5,505,244 A | 4/1996 | Thumann | |
| 5,778,955 A | 7/1998 | Chen | |
| 6,059,007 A * | 5/2000 | Tomita | E06B 9/54 160/264 |
| 6,412,537 B1 | 7/2002 | Voss et al. | |

(Continued)

FOREIGN PATENT DOCUMENTS

| | | |
|---|---|---|
| CA | 2542245 A1 | 4/2003 |
| CA | 2512125 A1 | 1/2006 |

(Continued)

*Primary Examiner* — Daniel P Cahn
*Assistant Examiner* — John W Hanes, Jr.
(74) *Attorney, Agent, or Firm* — FAEGRE DRINKER BIDDLE & REATH

(57) ABSTRACT

A retractable screen system for a fenestration assembly includes a catch assembly, a pair of edge rails, and a screen assembly. The catch assembly is configured to couple to an outer surface of a sash. The catch assembly includes a catch element. The screen assembly includes a roller housing, a roller assembly, a control bar, and screen material. The roller housing is configured to couple to an outer surface of the frame. The control bar includes a hook element extending along at least a portion of the control bar. The hook element is configured to selectively engage the catch element. The roller assembly is configured to apply tension to the screen material to permit the screen material to unwind from the roller assembly under a tension applied by moving the catch assembly away from the roller assembly when the hook element engages the catch element.

17 Claims, 16 Drawing Sheets

(56) References Cited

U.S. PATENT DOCUMENTS

| | | | | |
|---|---|---|---|---|
| 6,701,994 | B2 * | 3/2004 | Goldenberg | E06B 9/54 160/31 |
| 6,814,127 | B2 * | 11/2004 | Tagtow | E06B 9/54 160/31 |
| 7,080,676 | B2 * | 7/2006 | Abelson | E06B 9/54 160/99 |
| 7,703,498 | B2 * | 4/2010 | Holevas | E06B 9/60 160/99 |
| 7,726,377 | B2 | 6/2010 | Okachi | |
| 7,730,925 | B1 | 6/2010 | Pereira | |
| 7,730,926 | B2 | 6/2010 | Moriya et al. | |
| 7,819,167 | B2 | 10/2010 | Morin | |
| 7,891,398 | B2 | 2/2011 | Chino et al. | |
| 7,984,744 | B2 | 7/2011 | Karasawa et al. | |
| 9,416,587 | B2 | 8/2016 | Colson et al. | |
| 9,487,986 | B2 | 11/2016 | Okachi et al. | |
| 9,932,769 | B2 * | 4/2018 | Woolery | E06B 9/54 |
| 10,012,021 | B2 | 7/2018 | Hornung | |
| 10,041,294 | B2 | 8/2018 | Van Loosbroek | |
| 2003/0213564 | A1 * | 11/2003 | Pacholke | E06B 9/40 160/98 |
| 2004/0182522 | A1 | 9/2004 | Strand et al. | |
| 2005/0022943 | A1 * | 2/2005 | Thomas | E06B 9/08 160/27 |
| 2007/0033880 | A1 | 2/2007 | Holevas | |
| 2007/0199665 | A1 | 8/2007 | Studney | |
| 2008/0283204 | A1 * | 11/2008 | Beck | E06B 9/42 160/369 |
| 2012/0199294 | A1 | 8/2012 | Fayette et al. | |
| 2017/0044825 | A1 | 2/2017 | Zhang | |
| 2017/0211325 | A1 | 7/2017 | Riemelmoser et al. | |
| 2017/0275944 | A1 | 9/2017 | LaPlaca | |
| 2019/0136616 | A1 * | 5/2019 | Cito | E06B 9/54 |
| 2019/0226270 | A1 | 7/2019 | Hoogland et al. | |
| 2021/0238919 | A1 | 8/2021 | Vande Haar et al. | |

FOREIGN PATENT DOCUMENTS

| | | | |
|---|---|---|---|
| CA | 2359549 | C | 4/2006 |
| CA | 2629261 | A1 | 10/2008 |
| WO | 2009/065403 | A1 | 5/2009 |
| WO | 2014/059998 | A1 | 4/2014 |
| WO | 2016/015084 | A1 | 2/2016 |
| WO | 2018/232439 | A1 | 12/2018 |

* cited by examiner

RETRACTABLE SCREEN SYSTEM AND FENESTRATION ASSEMBLY

CROSS REFERENCE TO RELATED APPLICATIONS

The present application claims the benefit of U.S. Provisional Patent Application No. 62/927,799 filed Oct. 30, 2019, which is incorporated herein by reference in its entirety.

TECHNICAL FIELD

The present disclosure relates generally to fenestration assemblies. Specifically, the disclosure relates to fenestration assemblies including a hidden screen assembly.

BACKGROUND

Fenestration assemblies that include movable glass panels can also include a screen mounted in a fixed position to keep out insects or other pests, more colloquially known as "bugs." In some cases, the screen can be removed when not needed. However, in both cases, when screen is installed, viewing through at least one of the glass panels includes viewing through the screen, somewhat obscuring the view through the glass panel. Over time the screen can be continuously exposed to the elements, leading to an accumulation of airborne detritus on the screen, further obscuring the view.

Hidden screen assemblies that may move up and down with the movable sash of a single-hung window are known in the art. However, such hidden screen assemblies can be challenging to implement, particularly if the window is not initially designed to accommodate a hidden screen assembly.

SUMMARY

Various aspects of the disclosure relate to features for providing a hidden, actuatable screen that may move up and down with a sash of a window. In various examples, the screen is hidden in a roller housing attached to a sill or a head and may be drawn or pulled out and retracted with the opening and closing, respectively, of the sash.

According to one example, ("Example 1"), a retractable screen system for a fenestration assembly including a sash slidably engaged with a frame of the fenestration assembly includes a catch assembly, a pair of edge rails, and a screen assembly. The catch assembly is configured to couple to an outer surface of the sash. The catch assembly includes a catch element. Each edge rail of the pair of edge rails forms a rail slot and is configured to couple to opposite sides of the frame. The screen assembly includes a roller housing, a roller assembly, a control bar, and screen material. The roller housing is configured to couple to an outer surface of the frame. The roller assembly is disposed within the roller housing and substantially hidden from view. The control bar projects beyond the sash and into each of the rail slots. The control bar includes a hook element extending along at least a portion of the control bar. The hook element is configured to selectively engage the catch element. The screen material is coupled to the roller assembly. Edges of the screen material project into each of the rail slots. An end of the screen material is coupled to the control bar. The roller assembly is configured to apply tension to the screen material to wind the screen material around the roller assembly and to permit the screen material to unwind from the roller assembly under a tension applied by moving the catch assembly away from the roller assembly when the hook element engages the catch element.

According to another example, ("Example 2") further to Example 1, the catch assembly further includes a hood element configured to project away from the sash and beyond the control bar.

According to another example, ("Example 3") further to Example 1 or Example 2, the hook element is configured to disengage from the catch element as the catch assembly is tilted.

According to another example, ("Example 4") further to any of Examples 4, the control bar further comprises at least one linear cam and the system further comprises at least one lever configured to selectively engage the at least one linear cam to move the control bar away from the catch element to prevent the hook element from engaging the catch element.

According to another example, ("Example 5") further to Example 4, the at least one lever is configured to selectively engage the at least one linear cam by sliding in a direction parallel to the control bar.

According to another example, ("Example 6") further to Example 4 or Example 5, the at least one linear cam consists of two linear cams spaced apart along the control bar, and the at least one lever consists of two leavers coupled by a connecting rod and configured selectively engage the two linear cams at the same time.

According to another example, ("Example 7") further to any of Examples 1-6, the system is configured to not project beyond the frame.

According to another example, ("Example 8") further to any of Examples 1-7, each edge rail of the pair of edge rails comprises an outer edge rail and an inner edge rail, the inner edge rail in telescoping engagement with the outer edge rail.

According to another example, ("Example 9"), a fenestration assembly includes at least one sash, a frame surrounding the at least one sash and at least one retractable screen system. The at least one sash includes a first rail, a second rail opposite the first rail, two stiles connecting the first rail to the second rail, and a window pane surrounded by the first rail, the second rail, and the two stiles. The frame includes a first portion, a second portion opposite the first portion, and two jambs connecting the first portion to the second portion. The at least one sash is slidably engaged with the two jambs between an open configuration in which the first rail of the at least one sash is not in contact with the first portion or the second portion, and a closed configuration in which first rail of the at least one sash is in contact with the first portion or the second portion. The at least one retractable screen system includes a pair of edge rails coupled to the two jambs on opposite sides of the frame, a catch assembly coupled to an outer surface of the first rail, and a screen assembly. Each of the pair of edge rails forms a rail slot. The catch assembly includes a catch element. The screen assembly includes a roller housing coupled to an outer surface of the first portion, a roller assembly disposed within the roller housing and substantially hidden from view, a control bar, and screen material. The control bar projects beyond the at least one sash and into each of the rail slots. The control bar includes a hook element extending along at least a portion of the control bar. The hook element is configured to selectively engage the catch element. The screen material is coupled to the roller assembly. Edges of the screen material project into each of the rail slots and an end of the screen material is coupled to the control bar. The roller assembly is configured to apply tension to the screen material to wind the screen material around the roller assembly and to permit the screen material to unwind from the roller assembly when the hook element engages the catch element as the at least one sash slides away from roller assembly. The hook element automatically engages the catch element when the at least one sash transitions from the closed configuration to the open configuration.

According to another example, ("Example 10") further to Example 9, the catch assembly further includes a hood element configured to project from the at least one sash and project beyond the control bar.

According to another example, ("Example 11") further to Example 9 or Example 10, the at least one sash is configured to tilt out of a plane formed by the frame, automatically disengaging the hook element from the catch element.

According to another example, ("Example 12") further to any of Examples 9-12, the control bar further comprises at least one linear cam and the at least one retractable screen system further comprises at least one lever disposed between the control bar and the at least one sash, the at least one lever configured to selectively engage the at least one linear cam to move the control bar away from the catch element to prevent the hook element from automatically engaging the catch element when the at least one sash transitions from the closed configuration to the open configuration, and permit the control bar to move toward the catch element to allow the hook element to automatically re-engage the catch element as the at least one sash transitions from the open configuration to the closed configuration.

According to another example, ("Example 13") further to Example 12, the at least one lever is configured to selectively engage the at least one linear cam by sliding in a direction parallel to the control bar.

According to another example, ("Example 14") further to Example 13, the at least one linear cam includes two linear cams spaced apart along the control bar, and the at least one lever includes two leavers coupled by a connecting rod and configured selectively engage the two linear cams at about the same time.

According to another example, ("Example 15") further to any of Examples 9-14, the at least one retractable screen system does not project beyond the frame.

According to another example, ("Example 16") further to any of Examples 9-15, the at least one sash includes a lower sash, the first rail of the lower sash is a lower rail, the first portion of the frame is a bottom portion of the frame, the at least one retractable screen system includes a lower retractable screen system, the catch assembly of the lower retractable screen system is coupled to an exterior outer surface of the lower rail of the lower sash, and the roller housing of the lower retractable screen system is coupled to an exterior outer surface of the bottom portion of the frame, the lower rail of the lower sash in contact with the bottom portion of the frame in the closed configuration and not in contact with the bottom portion of the frame in the open configuration.

According to another example, ("Example 17") further to Example 16, the fenestration assembly is a single-hung window.

According to another example, ("Example 18") further to Example 16, the at least one sash further includes an upper sash, the first rail of the upper sash is an upper rail of the upper sash, the second portion of the frame is a top portion of the frame, the at least one retractable screen system further includes an upper retractable screen system, the catch assembly of the upper retractable screen system is coupled to an interior outer surface of the upper rail of the upper sash, and the roller housing of the upper retractable screen system is coupled to an interior outer surface of the top portion of the frame, the upper rail of the upper sash in contact with the top portion of the frame in the closed configuration and not in contact with the top portion of the frame in the open configuration.

According to another example, ("Example 19") further to Example 18, the fenestration assembly is a double-hung window.

According to another example, ("Example 20"), a method for fitting a retractable screen system to a fenestration assembly including a sash and a frame surrounding the sash includes coupling a pair of edges rails to outer surfaces of jambs on opposing sides of the frame, each of the edge rails forming a rail slot; coupling a screen assembly to an outer surface of a sill or a head of the frame such that a control bar of the screen assembly projects into each of the rail slots, the screen assembly including a roller assembly disposed with in a roller housing and screen material coupled to the roller assembly and to the control bar; and coupling a catch assembly to an outer surface of a lower rail or an upper rail, respectively, of the sash such that a catch element of the catch assembly automatically engages a hook element of the control bar and the screen material unwinds from the roller assembly as the sash slides away from the roller assembly and winds around the roller assembly as the sash slides toward the roller assembly.

According to another example, ("Example 21") further to Example 20, the method further comprises configuring the hook element and the catch element such that the hook element automatically disengages from the catch element as the sash is tilted out of a plane formed by the frame.

According to another example, ("Example 22") further to Example 20 or Example 21, the method further comprises coupling at least one linear cam to the control bar and coupling at least one lever to the frame between the control bar and the sash, the at least one lever configured to selectively engage the at least one linear cam to move the control bar away from the catch element to prevent the hook element from automatically engaging the catch element as the sash slides away from the roller assembly.

According to another example, ("Example 23"), a fenestration assembly includes at least one sash, a frame surrounding the at least one sash and at least one retractable screen system. The at least one sash includes a first stile, a second stile opposite the first stile, two rails connecting the first stile to the second stile, and a window pane surrounded by the first stile, the second stile, and the two rails. The frame includes a first jamb, a second jamb opposite the first jamb, a head and a sill. The head and the sill connect the first jamb to the second jamb. The at least one sash is slidably engaged with the head and the sill between an open configuration in which the first stile of the at least one sash is not in contact with the first jamb or the second jamb, and a closed configuration in which first stile of the at least one sash is in contact with the first jamb or the second jamb. The at least one retractable screen system includes a pair of edge rails coupled to the head and the sill on opposite sides of the frame, a catch assembly coupled to an outer surface of the first stile, and a screen assembly. Each of the pair of edge rails forms a rail slot. The catch assembly includes a catch element. The screen assembly includes a roller housing coupled to an outer surface of the first jamb, a roller assembly disposed within the roller housing and substantially hidden from view, a control bar and screen material. The control bar projecting beyond the at least one sash and into each of the rail slots. The control bar including a hook element extending along at least a portion of the control bar.

The hook element is configured to selectively engage the catch element. The screen material is coupled to the roller assembly. Edges of the screen material project into each of the rail slots. An end of the screen material is coupled to the control bar. The roller assembly is configured to apply tension to the screen material to wind the screen material around the roller assembly and to permit the screen material to unwind from the roller assembly when the hook element engages the catch element as the at least one sash slides away from roller assembly. The hook element automatically engages the catch element when the at least one sash transitions from the closed configuration to the open configuration.

According to another example, ("Example 24") further to Example 23, the control bar further comprises at least one linear cam and the at least one retractable screen system further comprises at least one lever disposed between the control bar and the at least one sash, the at least one lever configured to selectively engage the at least one linear cam to move the control bar away from the catch element to prevent the hook element from automatically engaging the catch element when the at least one sash transitions from the closed configuration to the open configuration, and permit the control bar to move toward the catch element to allow the hook element to automatically re-engage the catch element as the at least one sash transitions from the open configuration to the closed configuration.

According to another example, ("Example 25") further to Example 24, the at least one lever is configured to selectively engage the at least one linear cam by sliding in a direction parallel to the control bar.

According to another example, ("Example 26") further to Example 25, the at least one linear cam includes two linear cams spaced apart along the control bar, and the at least one lever includes two leavers coupled by a connecting rod and configured selectively engage the two linear cams at about the same time.

According to another example, ("Example 27") further to any of Examples 23-26, the at least one retractable screen system does not project beyond the frame.

According to another example, ("Example 28") further to any of Examples 23-27, the fenestration assembly is a horizontally sliding window.

According to another example, ("Example 29"), a method for fitting a retractable screen system to a fenestration assembly including a sash and a frame surrounding the sash includes coupling a pair of edges rails to outer surfaces of a head and a sill on opposing sides of the frame, each of the edge rails forming a rail slot; coupling a screen assembly to an outer surface of a jamb of the frame such that a control bar of the screen assembly projects into each of the rail slots, the screen assembly including a roller assembly disposed with in a roller housing and screen material coupled to the roller assembly and to the control bar; and coupling a catch assembly to an outer surface of a stile of the sash such that a catch element of the catch assembly automatically engages a hook element of the control bar and the screen material unwinds from the roller assembly as the sash slides away from the roller assembly and winds around the roller assembly as the sash slides toward the roller assembly.

According to another example, ("Example 30") further to Example 29, the method further comprises coupling at least one linear cam to the control bar and coupling at least one lever to the frame between the control bar and the sash, the at least one lever configured to selectively engage the at least one linear cam to move the control bar away from the catch element to prevent the hook element from automatically engaging the catch element as the sash slides away from the roller assembly.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

Figure 1:
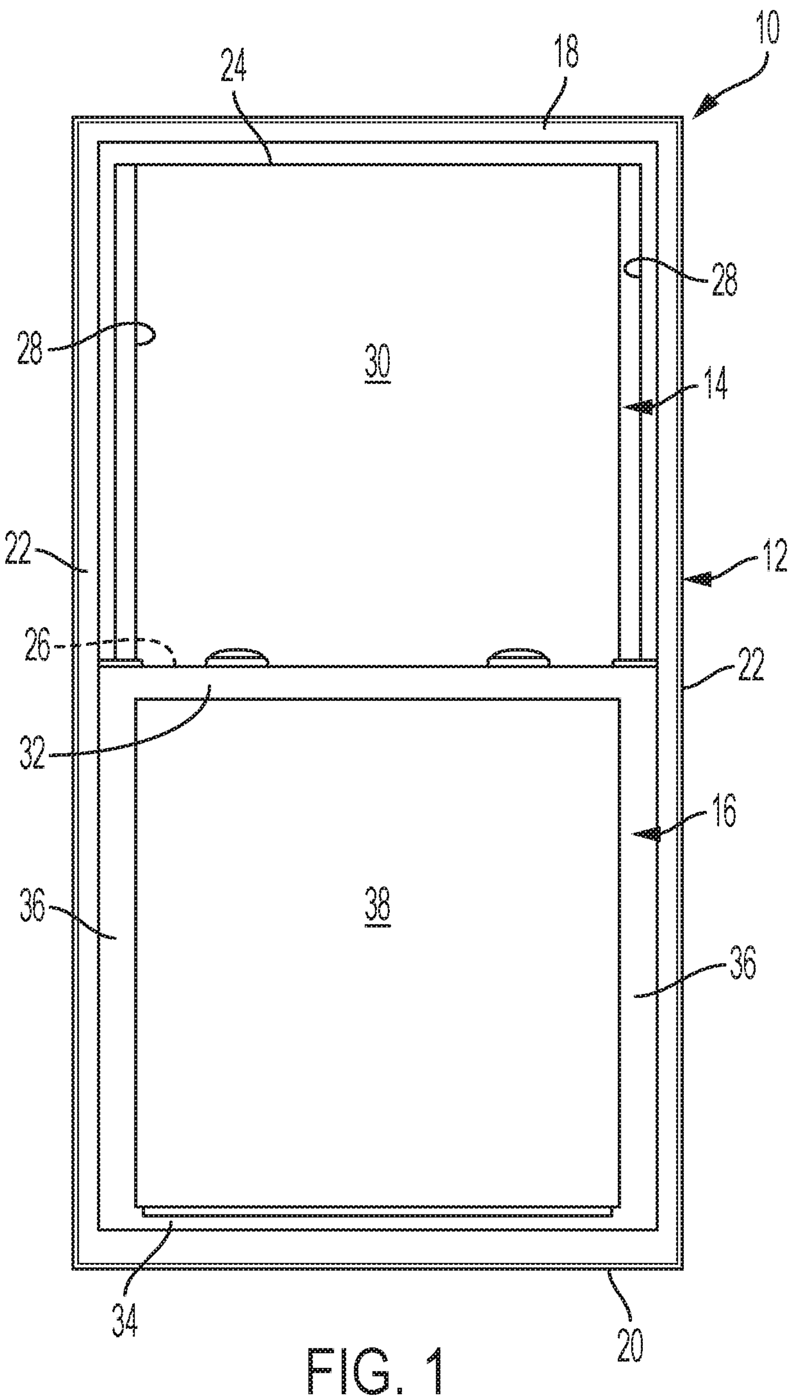
FIG. 1 is an interior view of a fenestration assembly, according to some embodiments of this disclosure.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

DETAILED DESCRIPTION

Some inventive concepts provided by this disclosure relate to retractable screen systems, fenestration assemblies including retractable screen systems and methods for fitting a retractable screen system to a fenestration assembly, for example. These inventive concepts are examples only, and further inventive concepts, as well as their advantages and associated functions will be appreciated from this disclosure.

This disclosure is not meant to be read in a restrictive manner. For example, the terminology used in the application should be read broadly in the context of the meaning those in the field would attribute such terminology.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only. For example, words such as "top", "bottom", "upper," "lower," "left," "right," "horizontal," "vertical," "upward," and "downward" merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

FIG. 1 is an interior view of a fenestration assembly 10, according to some embodiments of this disclosure. The fenestration assembly 10 may be a single-hung window or a double-hung window that includes a frame 12, an upper sash 14, and a lower sash 16. The frame 12 can include a top portion, or head 18, a bottom portion, or sill 20, and jambs 22. Together, the head 18, the sill 20, and the jambs 22 surround and support the upper sash 14 and the lower sash 16. In a single-hung window, the upper sash 14 is fixed and the lower sash 16 slidably engages with the two jambs 22. In a double-hung window, the both the upper sash 14 and the lower sash 15 are slidably engaged with the two jambs. 22. The upper sash 14 can include an upper rail 24, a lower rail 26 (FIG. 2), stiles 28, and window pane 30. Together, the upper rail 24, the lower rail 26, and the stiles 28 surround and support the window pane 30. The lower sash 16 can include an upper rail 32, a lower rail 34, stiles 36, and window pane 38. Together, the upper rail 32, the lower rail 34, and the stiles 36 surround and support the window pane 38.

Figure 2:
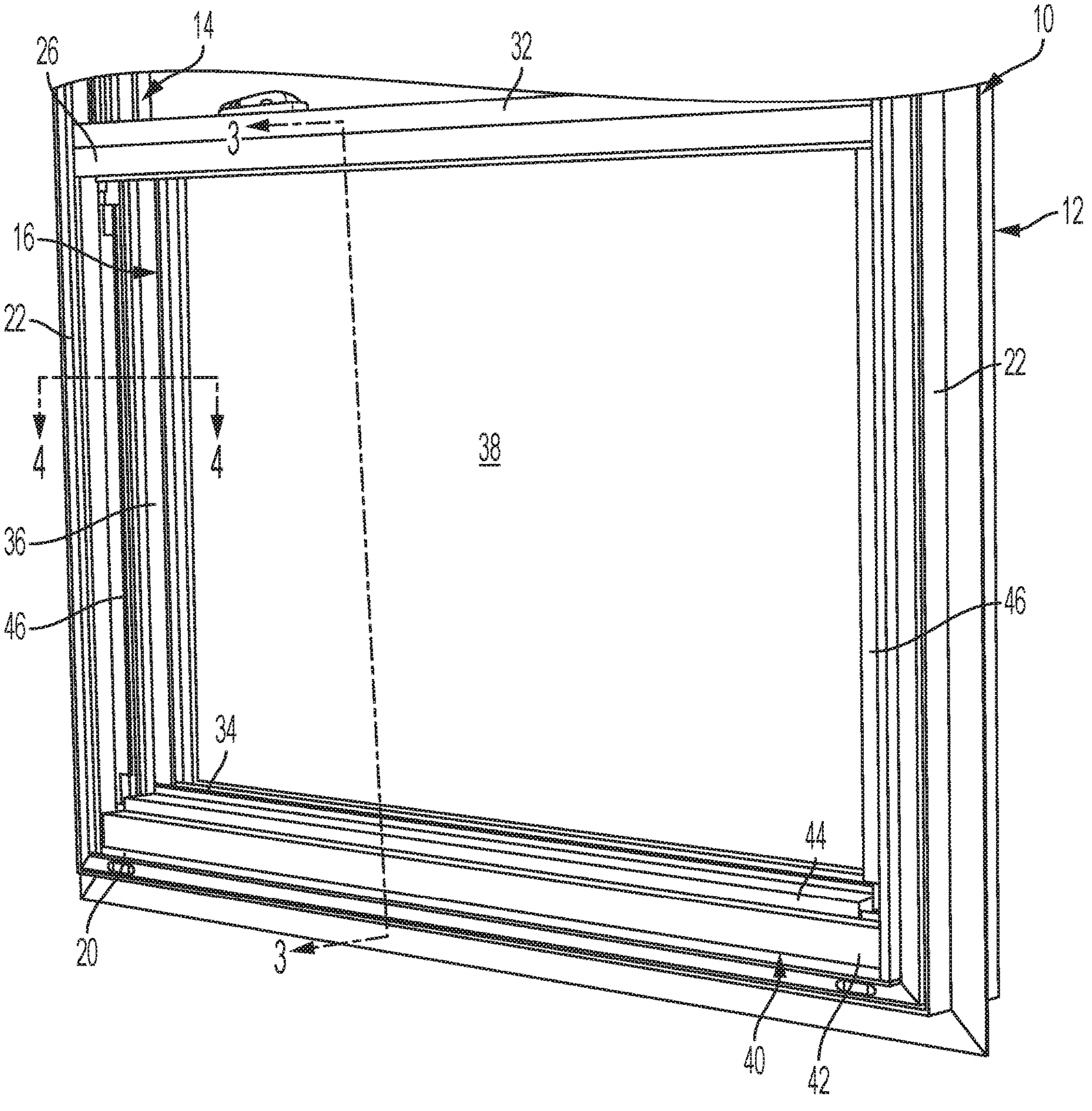
FIG. 2 is an exterior perspective view of a portion of the fenestration assembly of FIG. 1 including a retractable screen system, according to some embodiments of this disclosure.
Figure 3:
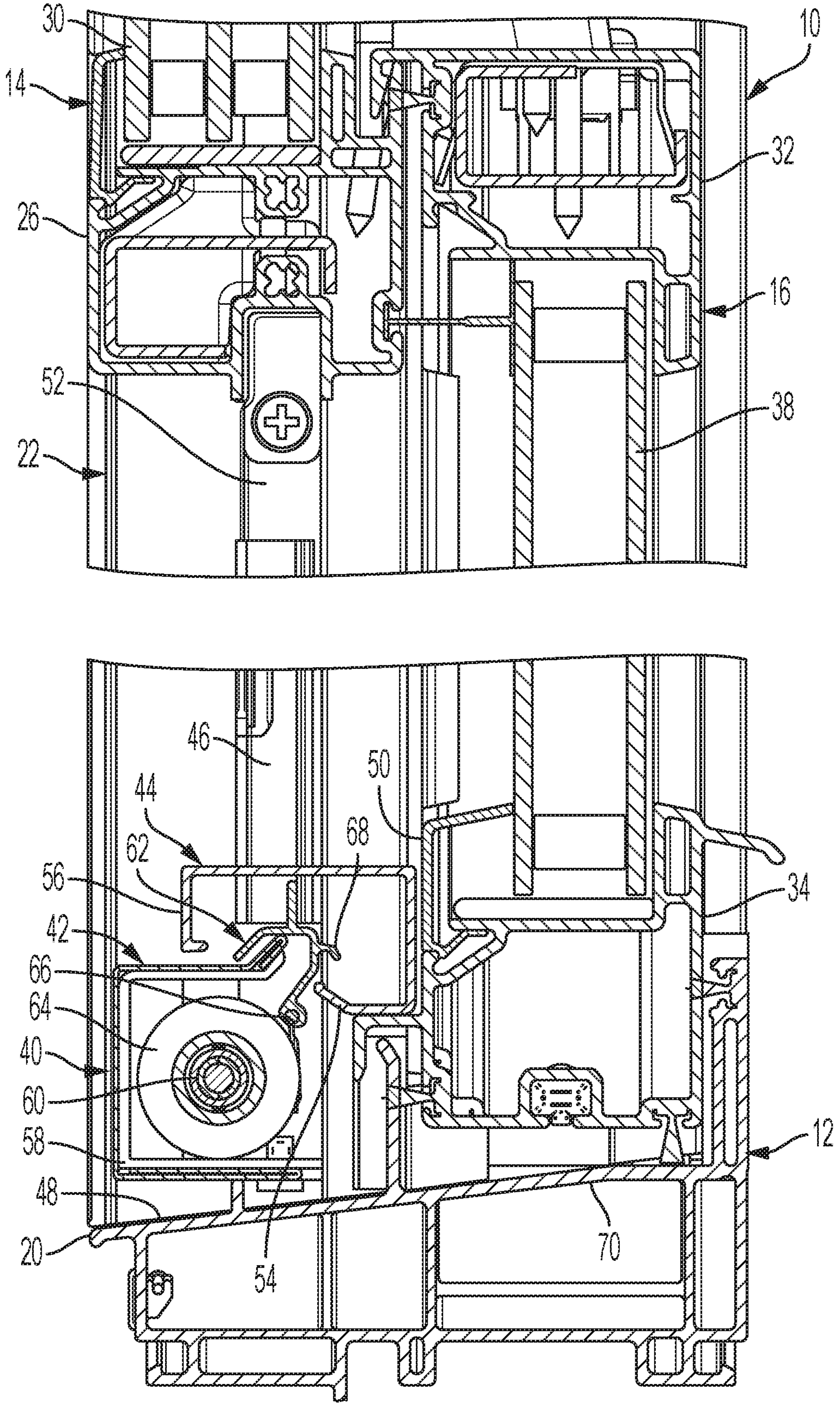
FIG. 3 is a side cross-sectional view of the fenestration assembly of FIG. 2 showing the lower sash and the retractable screen system, according to some embodiments of this disclosure.

FIG. 2 is an exterior perspective view of a portion of the fenestration assembly 10 of FIG. 1 including a retractable screen system 40, according to some embodiments of this disclosure. FIG. 2 shows the retractable screen system 40 including a screen assembly 42, a catch assembly 44, and a pair of edge rails 46. The screen assembly 42 is coupled to an outer surface of the frame 12, specifically an outer surface of each of the two jambs 22 on opposite sides of the frame 12, specifically outer surfaces 52 (FIG. 3) and near an outer surface 48 (FIG. 3) of the bottom portion, or sill 20. The catch assembly 44 is coupled to an outer surface of the lower sash 16, specifically an outer surface 50 of the lower rail 34. As shown in FIG. 2, each of the two edge rails 46 is coupled to an outer surface of each of the two jambs 22 on opposite sides of the frame 12, specifically outer surfaces 52 (FIG. 3). The screen assembly 42, the catch assembly 44 and the pair of edge rails 46 are coupled to the outer surfaces of the fenestration assembly 10 by any means known in the art, such as by mechanical fasteners, such as screws, bolts, rivets or nails, for example, by a mechanical interlocking of parts, or by one or more adhesive fasteners, such as a silicone adhesive, an epoxy adhesive, a polyurethane adhesive, or by an acrylic adhesive foam tape, for example, or by any combination of coupling means. For example, in some embodiments, the screen assembly 42 is coupled to each of the two jambs 22, specifically outer surfaces 52, by endcaps (not shown) that engage grooves in each of the two jambs 22 that would normally retain a standard flat screen, the catch assembly 44 is mounted to the outer surface of the lower sash 16 by an acrylic foam tape that consists of layers of acrylic tape on each side of a thin layer of foam, and each of the two edge rails 46 is coupled to each of the two jambs 22, specifically outer surfaces 52 (FIG. 3) by the acrylic foam tape.

FIG. 3 is a side cross-sectional view of the fenestration assembly 10 of FIG. 2 showing the lower sash 16 and the retractable screen system 40, according to some embodiments of this disclosure. As shown in FIG. 3, the catch assembly 44 includes a catch element 54 and, optionally, a hood element 56. The screen assembly 42 includes a roller housing 58, a roller assembly 60, a control bar 62, and screen material 64 having an end 66.

The catch element 54 can be a hooked-shaped structure projecting from the lower rail 34 of the lower sash 16 and curving upward away from the roller assembly 60. The hood element 56 projects from the lower rail 34 of the lower sash 16 and extends beyond the control bar 62. In some embodiments, the hood element 56 may be a hook-shaped structure curving downward to conceal the control bar 62 and to protect portions of the screen assembly 42 from environmental exposure and shed water that may sheet down from the upper sash 14 and lower sash 16. In some embodiments, the catch assembly 44 may be a single integrated structure incorporating the catch element 54 and the hood element 56, as shown in FIG. 3. In some embodiments, the catch assembly 44 may extend along substantially the entire length of the lower sash 16.

The roller housing 58 can be a hollow structure extending substantially the width of the lower sash 16. The roller assembly 60 can be a tubular, rotationally biased structure. In some embodiments, the roller assembly 60 may include a damper assembly to reduce the rotational velocity of the roller assembly 60. In some embodiments, the roller assembly 60 can be as described in U.S. patent application Ser. No. 16/429,345 entitled "ROLLER ASSEMBLY AND SCREEN END RETENTION FEATURES FOR A HIDDEN SCREEN ASSEMBLY AND A FENESTRATION ASSEMBLY", which is incorporated herein by reference in its entirety. The control bar 62 can include a hook element 68. The control bar 62 can extend at least the width of the lower sash 16. The hook element 68 can be a hooked-shaped structure projecting toward the lower sash 16 from the control bar 62 and curving downward toward the roller assembly 60. The hook element 68 can extend along at least a portion of the control bar 62. In some embodiments, the hook element 68 may extend along substantially the entire length of the control bar 62. So configured, the hook element 68 can selectively engage the catch element 54, as described below in reference to FIGS. 6A and 6B. The screen material 64 can be a polymer mesh and, in some embodiments, include a polymer coating. For example, in some embodiments, the screen material 64 can be a fiberglass mesh coated with polyvinyl chloride.

The catch assembly 44 may be made of a metal, such as aluminum, or a polymer, such as polyvinyl chloride, for example and may be formed by extrusion. The roller housing 58 may be formed by extrusion or by rolling or folding a sheet of a metal, such as aluminum, or a polymer, such as polyvinyl chloride, for example. The control bar 62 may be formed by extrusion of a metal, such as aluminum, for example.

The roller assembly 60 can be disposed with in the roller housing 58. In this way, the roller housing 58 can protect the roller assembly 60 from environmental exposure and substantially hide the roller assembly 60 from view for more aesthetically pleasant appearance. The control bar 62 can be attached to the end 66 of the screen material 64 by, for example, a mechanical connector, such as a spline, for example, or by an adhesive fastener. Alternatively, or additionally, a strip made of a polymer, such as extruded polyvinyl chloride, may be welded along a leading edge of the screen material 64 and the strip pressed or slid into a mating slot on the control bar 62. Another end (not shown) of the screen material 64 opposite the end 66 of the screen material 64 can be attached to the roller assembly 60. The roller assembly 60 is rotationally biased to cause the screen material 64 to coil, wind or roll up, around the roller assembly 60 until tension provided by the connection of the end 66 of the screen material 64 to the control bar 62 prevents further winding about the roller assembly 60.

As noted above, the screen assembly 42, the catch assembly 44 and the pair of edge rails 46 are coupled to the outer surfaces 48, 50 and 52 of the fenestration assembly 10. As used herein, "outer surface" means a surface on the outside of the fenestration assembly 10, as opposed to an inner surface which is a surface on the inside of the frame 12, such as inner surface 70 shown in FIG. 3, for example. Thus, an outer surface of the fenestration assembly 10 can be on either the exterior side or interior side of the fenestration assembly 10.

Figure 4:
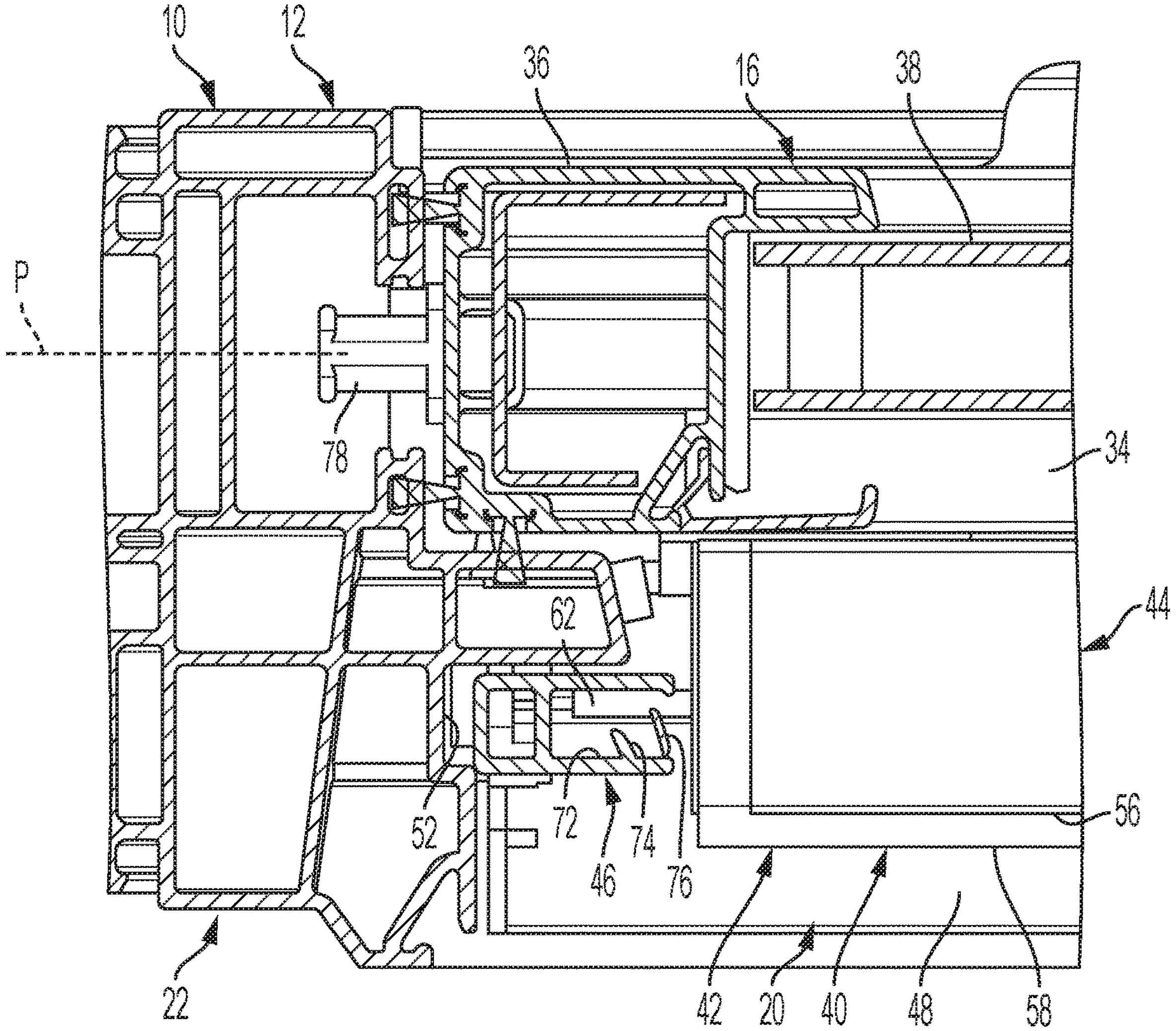
FIG. 4 is a top cross-sectional view of a portion of the fenestration assembly of FIG. 2, showing one of the jambs, the lower sash and the retractable screen system, according to some embodiments of the disclosure.

FIG. 4 is a top cross-sectional view of a portion of the fenestration assembly 10 of FIG. 2, showing one of the jambs 22, the lower sash 16 and the retractable screen system 40, according to some embodiments of the disclosure. As shown in FIG. 4, each of the edge rails 46 (one shown in FIG. 4) forms a rail slot 72. In some embodiments, the control bar 62 projects into each of the rails slots 72 to guide the screen material 64 (FIG. 3) through the rail slots 72. In some embodiments, the edge rails 46 may include one or more structures projecting into each of the rail slots 72, such as weather stripping 74 to provide a barrier to pests passing along the edge of the screen material 64, or a screen edge retention feature 76 to help maintain the screen material 64 within the rail slots 72, as described in U.S. patent application Ser. No. 16/222,416 entitled "SCREEN EDGE RETENTION AND SCREEN RETHREADING FEATURES FOR A HIDDEN SCREEN ASSEMBLY AND A FENESTRATION ASSEMBLY", which is incorporated herein by reference in its entirety.

Figure 5:
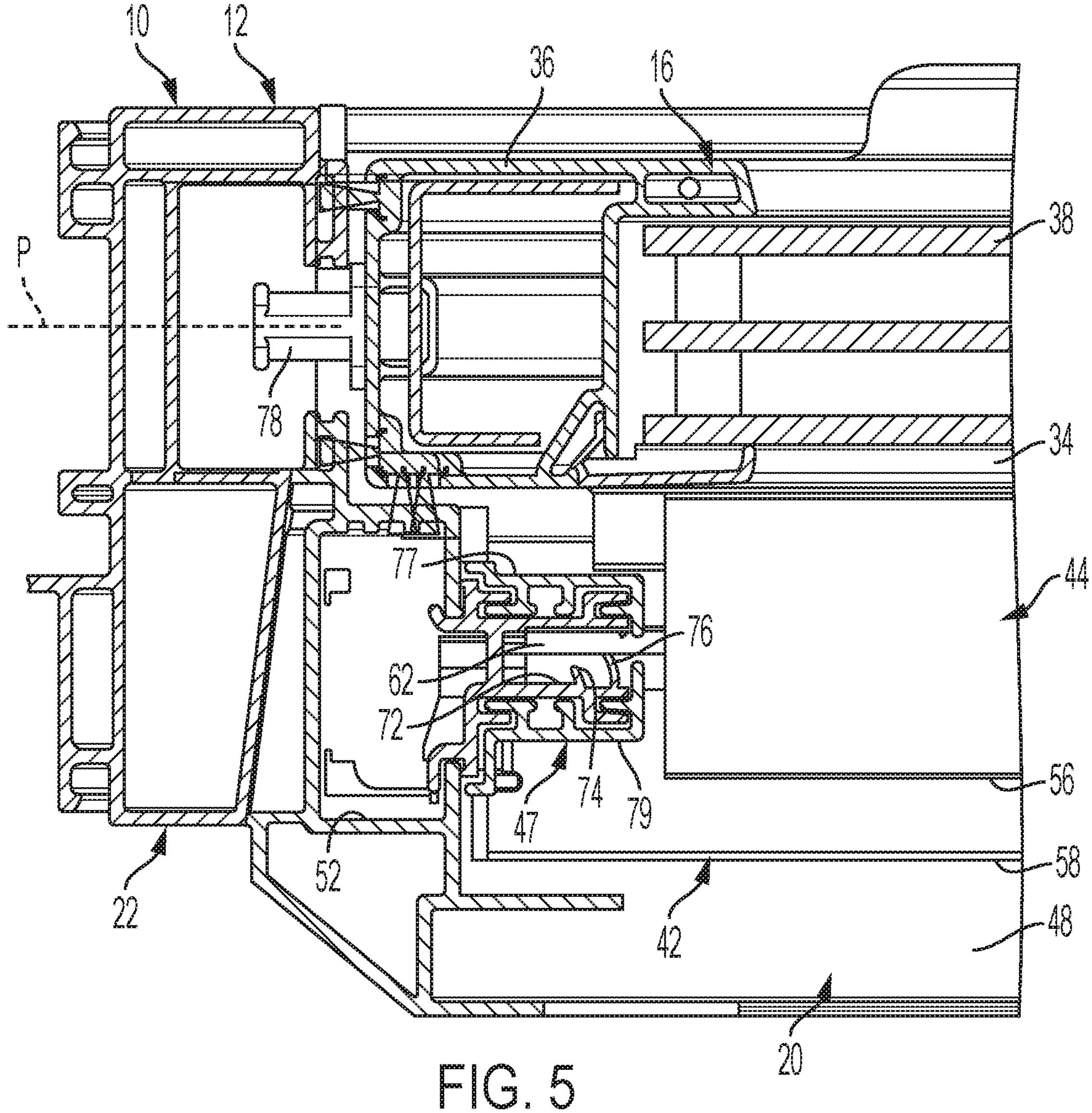
FIG. 5 is a top cross-sectional view of a portion of the fenestration assembly of FIG. 2, showing one of the jambs, the lower sash and the retractable screen system, according to some other embodiments of the disclosure.

The edge rails 46 described above in reference to FIG. 4 are suitable for single-hung windows. However, for double-hung windows, the presence of the edge rails 46 on the outer surfaces 52 of the jambs 22 may substantially impede the movement of the upper sash 14 away from the head 18. FIG. 5 is a top cross-sectional view of a portion of the fenestration assembly 10 of FIG. 2, showing one of the jambs 22, the lower sash 16 and the retractable screen system 40, according to some other embodiments of the disclosure. The embodiment of FIG. 5 is substantially identical to the embodiment of FIG. 4, except that the edge rails 46 are replaced by edge rails 47. The edge rails 47 can telescope down to a shorter length as the upper sash 14 moves away from the head 18 to permit significantly more movement of the upper sash 14. As shown in FIG. 5, each of the edge rails 47 (one shown in FIG. 5) includes an outer edge rail 77 and an inner edge rail 79. The inner edge rail 79 is in telescoping engagement with the outer edge rail 77. The inner edge rail 79 of the edge rail 47 forms the rail slot 72 and may include one or more structures projecting into each of the rail slots 72, such as weather stripping 74, to provide a barrier to pests passing along the edge of the screen material 64, or a screen edge retention feature 76 to help maintain the screen material 64 within the rail slot 72. As the upper sash 14 is moved away from the head 18, the upper sash 14 can push against the inner edge rail 79, shortening the effective length of the edge rail 47 by telescoping the inner edge rail 79 into the outer edge rail 77, thus permitting greater movement of the upper sash 14 away from the head 18. Conversely, as the lower sash 16 is moved away from the sill 20, the control bar 62 pushes against the end of the inner edge rail 79, which is sufficiently closed to prevent passage of the control bar 62 out of the end of the inner edger ail 79, thus length of the edge rail 47 by telescoping the inner edge rail 79 out of the outer edge rail 77 to provide the full range of movement for the lower sash 16 while maintaining the screen material 64 within the rail slots 72.

In the embodiments shown in FIGS. 4 and 5, the lower sash 16 is configured to tilt out of a plane P of the frame 12 about a pivot 78. The ability to tilt the lower sash 16 out of a plane P permits access to an external surface of the window pane 38 for cleaning.

Figure 6A:
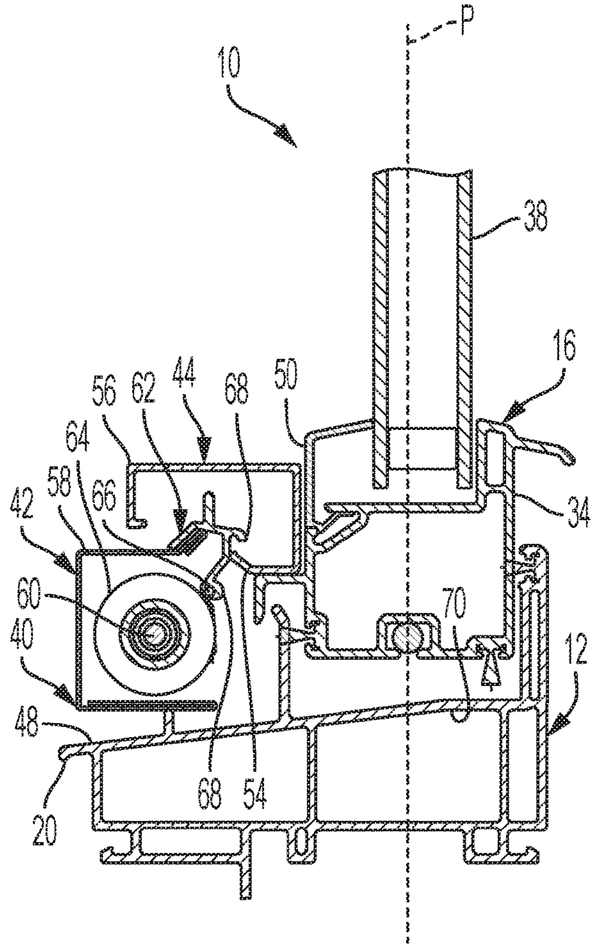
FIGS. 6A and 6B are schematic side cross-sectional views of the lower sash and the retractable screen system of FIG. 2 in a closed configuration and in an open configuration, respectively, according to some embodiments of the disclosure.
Figure 6B:
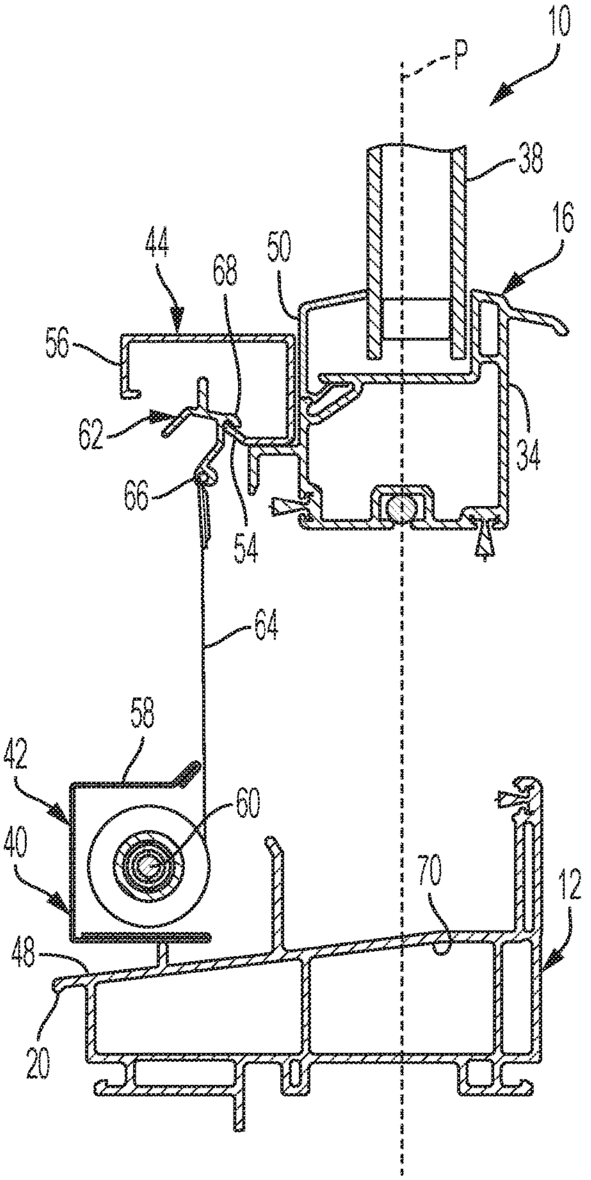

FIGS. 6A and 6B are schematic side cross-sectional views of the lower sash 16, and the retractable screen system 40 of FIG. 2 in a closed configuration and in an open configuration, respectively, according to some embodiments of the disclosure. FIG. 6A shows the lower sash 16 in the closed configuration in which the lower sash 16 is in contact with the sill 20. FIG. 6B shows the lower sash 16 in the open configuration in which the lower sash 16 is not in contact with the sill 20. As shown in FIG. 6A, when the lower sash 16 is in the closed configuration, the control bar 62 is in contact with, and held in position by, the roller housing 58 and the tension applied by the rotational bias of the roller assembly 60; the hook element 68 does not engage the catch element 54; and substantially all of the screen material 64 is coiled around the roller assembly 60. The surfaces of the roller housing 58 and the control bar 62 where they contact each other are configured such that the tension applied by the rotational bias of the roller assembly 60 forces the hook element 68 of the control bar 62 toward the catch element 54 of the catch assembly 44. As shown in FIG. 6B, as the lower sash 16 is raised and slides away from the roller assembly 60, the lower sash 16 transitions from the closed configuration into the open configuration. As the lower sash 16 transitions from the closed configuration into the open configuration, the catch element 54 comes into contact with the hook element 68, at which point the hook element 68 automatically engages the catch element 54 of the catch assembly 44 and moves the control bar 62 out of contact with the roller housing 58. As the lower sash 16 continues to slide away from the roller assembly 60, tension is applied to the end 66 of the screen material 64 to cause the screen material 64 to unwind from the roller assembly 60. The tension can draw the screen material 64 taut as it extends between the roller assembly 60 and the lower rail 34 of the lower sash 16.

As additional tension is applied to the end 66 of the screen material 64 by moving the lower sash 16 away from the roller assembly 60, the screen material 64 continues to unwind from the roller assembly 60 against the rotational bias of the roller assembly 60. Conversely, as the tension applied to the end 66 of the screen material 64 is reduced by moving the lower sash 16 toward the roller assembly 60, the rotational bias of the roller assembly 60 winds the screen material 64 around the roller assembly 60. The lower sash 16 can be moved vertically within the frame 12 to open or close an area of the fenestration assembly 10 and extend or retract the screen material 64. The lower sash 16 can be moved fully downward to be in contact with the sill 20 in the closed configuration, closing the area of fenestration assembly 10 between the lower sash 16 and the sill 20 and retracting the screen material 64 into the roller assembly 60, bringing the control bar 62 into contact with the roller housing 58, as shown in FIG. 6A. In the closed configuration, the screen material 64 does not obscure the view through the window pane 38. Also, the retracted screen material 64 is protected from the elements by the roller housing 58 when not in use, reducing the opportunity for the accumulation of detritus on the screen material 64. As noted above, in some embodiments, the hood element 56 may also protect portions of the screen assembly 42 from environmental exposure when the lower sash 16 is in the closed configuration. In the open configuration, the screen material 64 does not cover the lower sash 16, unlike a conventional full screen, which provides for an improved aesthetic appearance of the fenestration assembly 10.

Figure 7A:
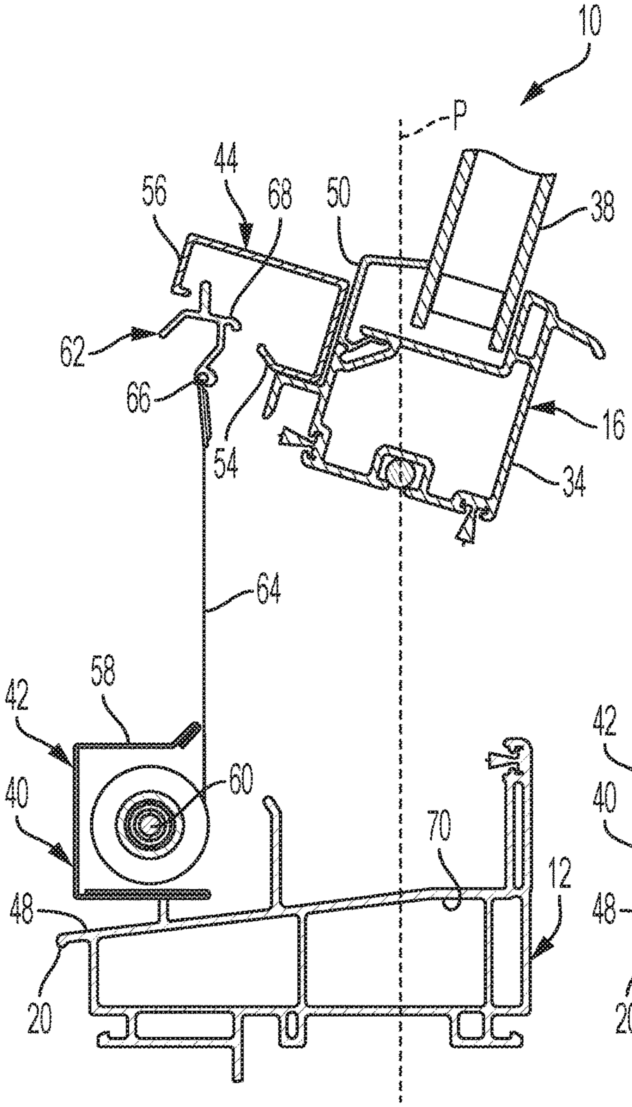
FIGS. 7A and 7B are schematic side cross-sectional views of the lower sash and the retractable screen system of FIG. 2 showing a hook element disengaging from a catch element as the lower sash 16 is tilted, according to some embodiments of this disclosure.
Figure 7B:
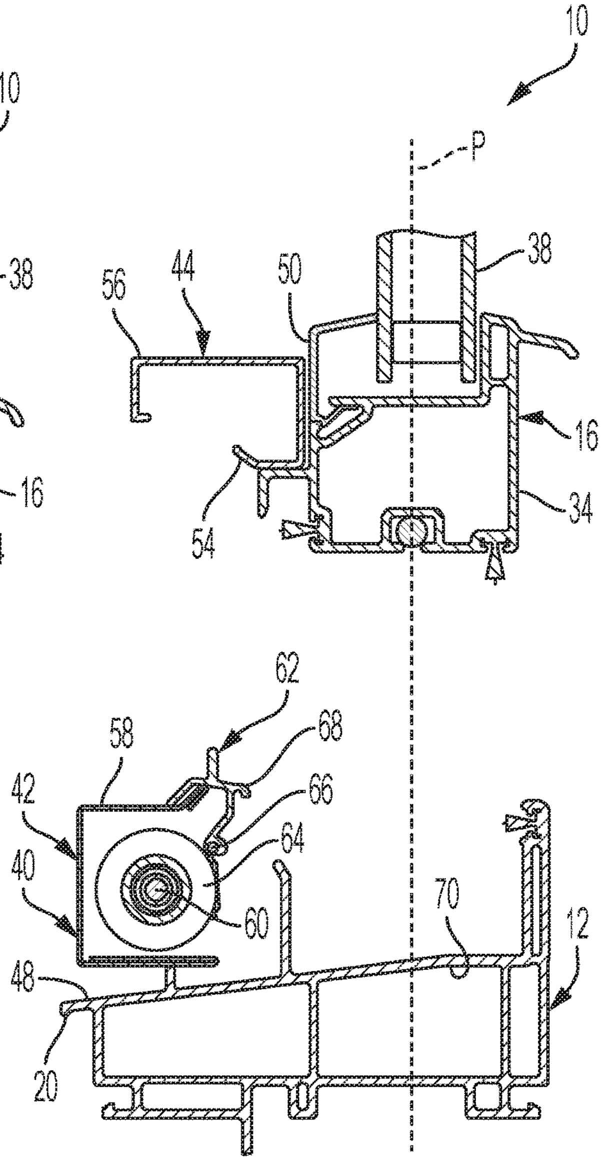

FIGS. 7A and 7B are schematic side cross-sectional views of the lower sash 16 and the retractable screen system 40 of FIG. 2 showing the hook element 68 disengaging from the catch element 54 as the lower sash 16 is tilted, according to some embodiments of this disclosure. FIG. 7A shows the fenestration assembly 10 with the lower sash 16 tilted out of the plane P and FIG. 7B shows the fenestration assembly 10 with the lower sash 16 returned to plane P. As shown in FIG. 7A, tilting the lower sash 16 out of plane P by rotation the lower sash 16 about the pivot 78 (FIGS. 4 and 5), causes the hook element 68 to disengage from the catch element 54. As shown in FIG. 7B, once the hook element 68 is disengaged from the catch element 54, the tension applied to the end 66 of the screen material 64 is eliminated and the rotational bias of the roller assembly 60 winds the screen material 64 around the roller assembly 60 and pulls the control bar 62 back into contact with the roller housing 58.

The lower sash 16 may be moved downward toward the sill 20 to the closed configuration shown in FIG. 6A. As the lower sash 16 is lowered, the hook shape of the catch element 54 pushes the control bar 62 away from the lower sash 16, permitting the catch element 54 to pass by the control bar 62 without engaging the hook element 68. Once the catch element 54 moves past the hook element 68, the tension applied to the end 66 of the screen material 64 pulls the control bar 62 back toward the lower sash 16 so that the hook element 68 is automatically positioned to engage the catch element 54 when the lower sash 16 is again raised and slid away from the roller assembly 60.

Figure 8:
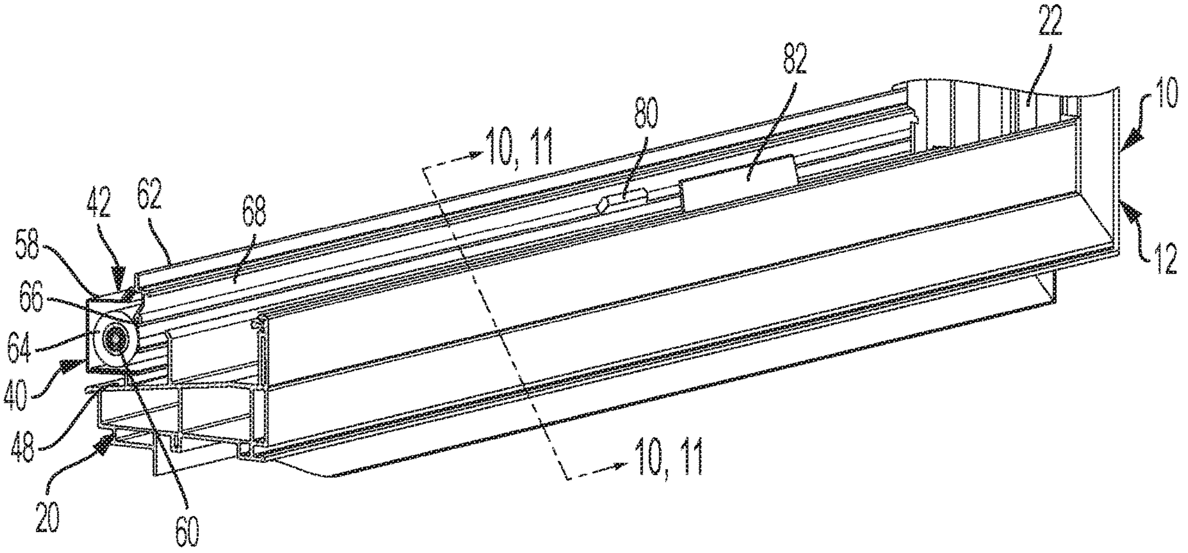
FIG. 8 is an interior perspective cross-sectional view of a portion the fenestration assembly of FIG. 1, further including elements to selectively prevent a hook element from engaging catch element 54, according to some embodiments of this disclosure.

FIG. 8 is an interior perspective cross-sectional view of a portion the fenestration assembly 10 of FIG. 1, further including elements to selectively prevent the hook element 68 from engaging the catch element 54, according to some embodiments of this disclosure. The lower sash 16 has been omitted for clarity. FIG. 8 shows the lower portion of an embodiment of the fenestration assembly 10 in which the control bar 62 further includes at least one linear cam 80 and the retractable screen system 40 further includes at least one lever 82. The linear cam 80 is disposed along a portion the control bar 62 adjacent to the lower sash 16 and the lever 82 is disposed between the control bar 62 and the lower sash 16 when the lower sash 16 is in the closed configuration. In use, the lever 82 can be slid along the control bar 62 until the lever 82 contacts the linear cam 80 and pushes the control bar 62 away from the lever 82 to move the hook element 68 away from the lower sash 16. In some embodiments, the lever 82 can be slid in a direction parallel to the control bar 62. Conversely, the lever 82 can be slid along and parallel to the control bar 62 until the lever 82 no longer contacts the linear cam 80, allowing the hook element 68 to move back toward the lower sash 16 as the tension applied to the end 66 of the screen material 64 pulls the control bar 62 back toward the lower sash 16. Thus, the at least one lever 82 is configured to selectively engage the at least one linear cam 80 to move the control bar 62 away from the catch element 54 to prevent the hook element 68 from automatically engaging the catch element 54 as the lower sash 16 transitions from the close configuration to the open configuration.

Figure 9:
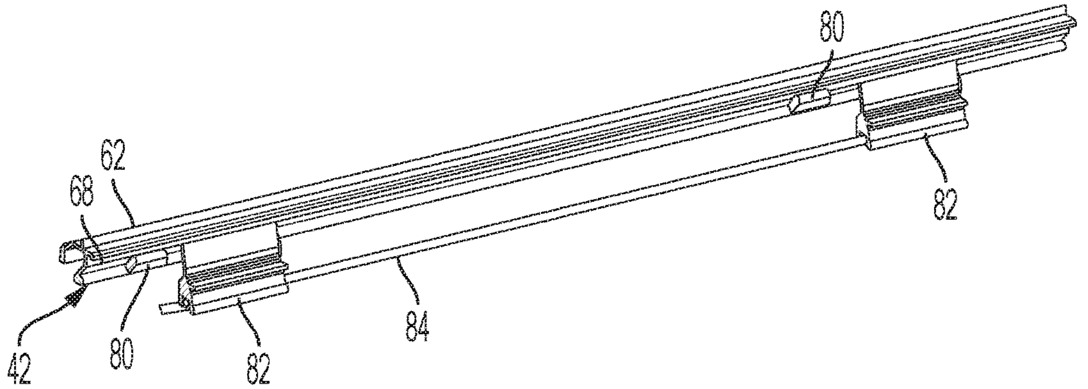
FIG. 9 is an interior perspective cross-sectional view portion of the retractable screen system of FIG. 8, according to some embodiments of the disclosure.

FIG. 9 is an interior perspective cross-sectional view portion of the retractable screen system 40 of FIG. 8, according to some embodiments of the disclosure. In the embodiment shown in FIG. 9, the control bar 62 includes two linear cams 80 spaced apart from each other along the control bar 62 and the at least one lever 82 includes of two levers 82 connected by a connecting rod 84. The sill 20, the jamb 22 and the rest of the retractable screen system 40 have been omitted for clarity. In the embodiment of FIG. 9, sliding one of the two levers 82 along the control bar 62 automatically slides the other of the two levers 82 along the control bar 62 due to a rigid connection provided by the connecting rod 84. The two levers 82 are disposed such that as the levers 82 slide along and parallel to the control bar 62, they each contact one of the two linear cams 80 at about the same time to evenly push the control bar 62 and the hook element 68 away from the lower sash 16.

Figure 10:
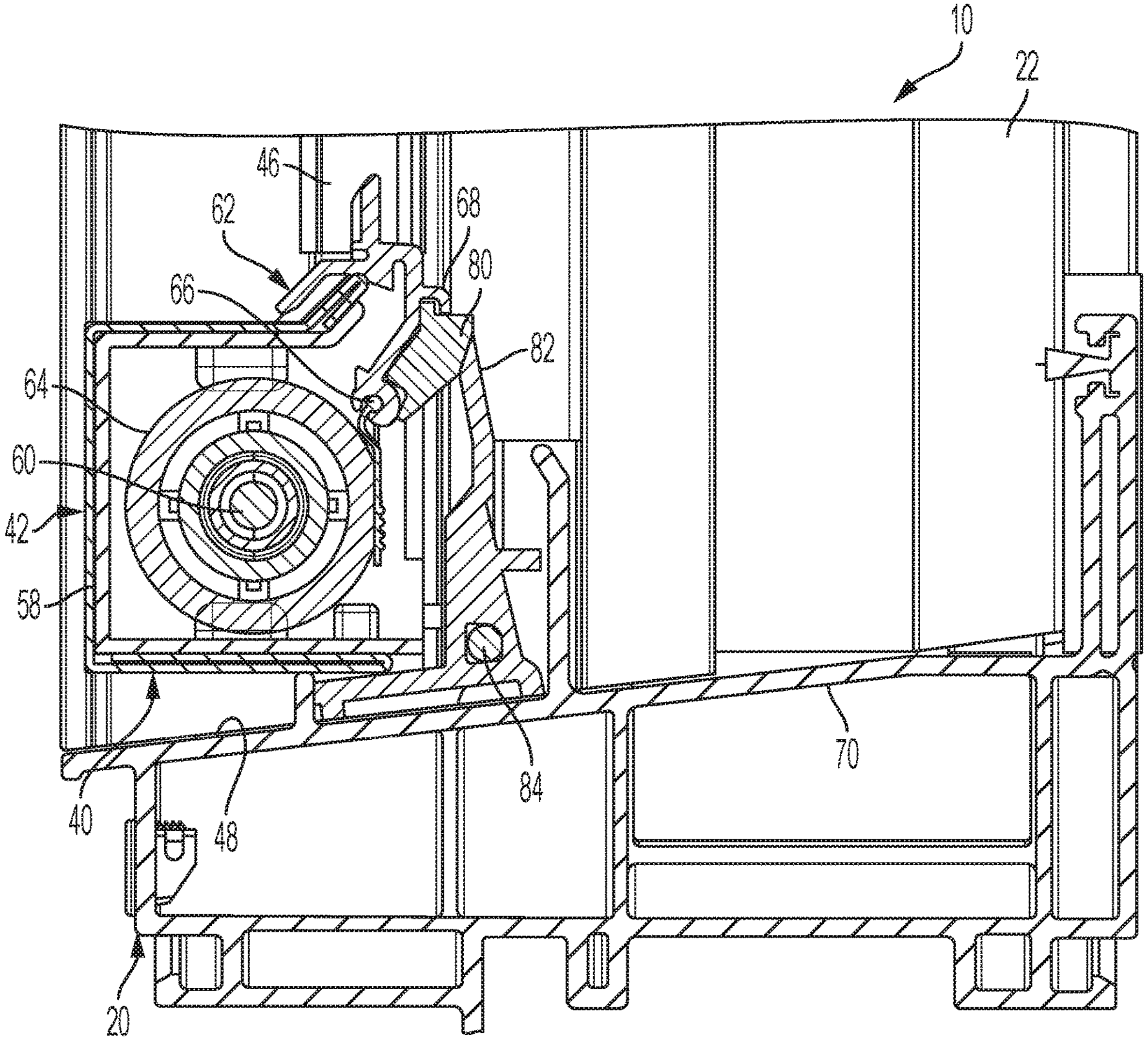
FIG. 10 is a side cross-sectional view of the fenestration assembly of FIG. 8 showing a portion of the retractable screen system, according to some embodiments of this disclosure.

FIG. 10 is a side cross-sectional view of the fenestration assembly 10 of FIG. 8 showing a portion of the retractable screen system 40, according to some embodiments of this disclosure. In FIG. 10, the lower sash 16 and catch assembly 44 are not visible because, in the embodiment of FIG. 10, the lower sash 16 must be raised to access the lever 82 so it can be slid along the control bar 62. As shown in the embodiment of FIG. 10, the linear cam 80 may be coupled to the control bar 62 by engaging a portion of the hook element 68 as well as a portion of the control bar 62 that couples to the end 66 of the screen material 64. As shown in FIG. 10, the linear cam 80 and the lever 82 are disposed such that they will interfere with each other when in contact to push the control bar 62 away from the lower sash 16 so that the catch element 54 cannot engage the hook element 68.

Figure 11:
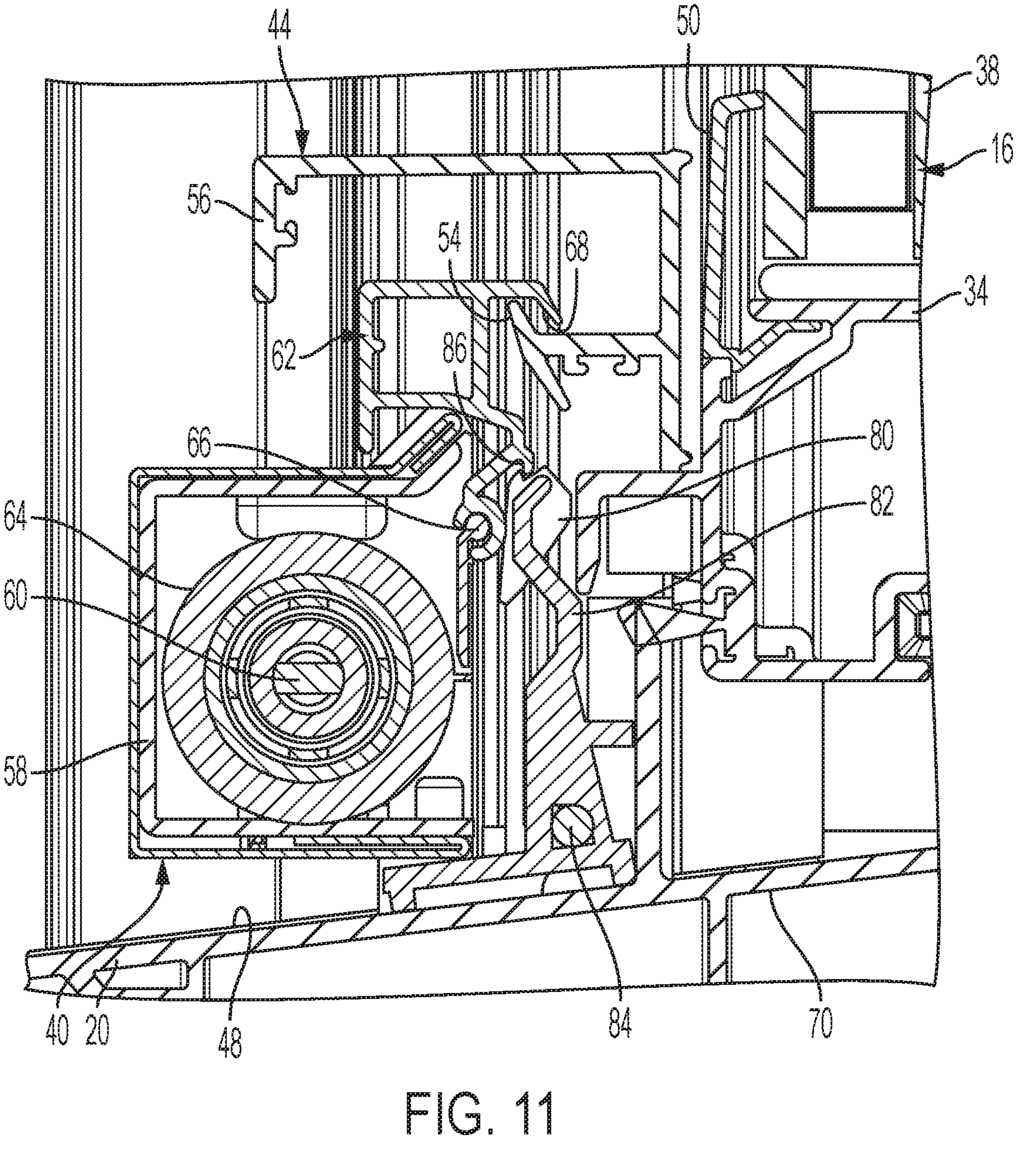
FIG. 11 is a side cross-sectional view of the fenestration assembly of FIG. 8 showing a portion of the retractable screen system, according to some other embodiments of this disclosure.

FIG. 11 is a side cross-sectional view of the fenestration assembly 10 of FIG. 8 showing a portion of the retractable screen system 40, according to some other embodiments of this disclosure. In the embodiment of FIG. 11, the linear cam 80 may be coupled to the control bar 62 by engaging a cam hook 86 as well as the portion of the control bar 62 that couples to the end 66 of the screen material 64. The cam hook 86 is disposed away from the hook element 68 such that the linear cam 80 and the lever 82 are not colinear with the hook element 68. As shown in FIG. 11, the linear cam 80 and the lever 82 are disposed such that they will interfere with each other when in contact to push the control bar 62 away from the lower sash 16 so that the catch element 54 cannot engage the hook element 68.

Figure 12A:
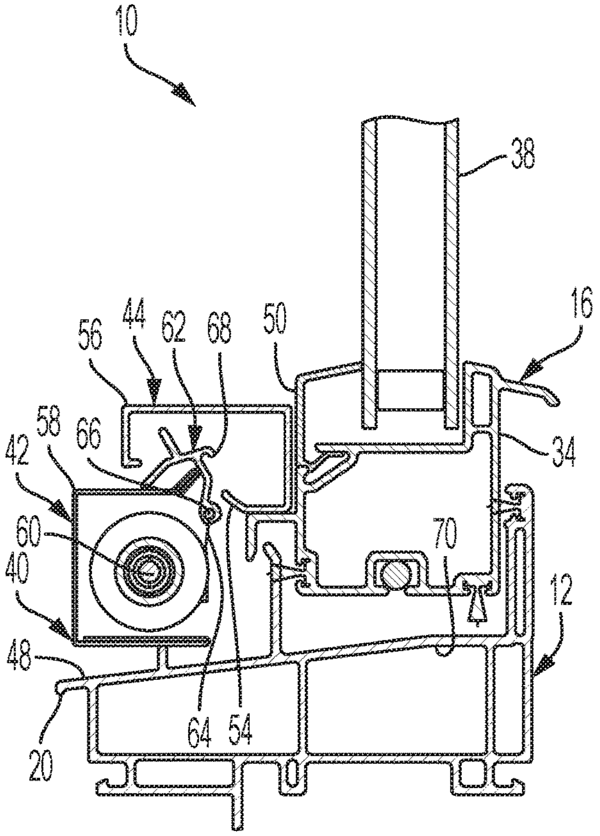
FIGS. 12A and 12B are schematic side cross-sectional views of the lower sash and the retractable screen system of FIGS. 8-11 in a closed configuration and in an open configuration when the at last one lever engages the at least one linear cam, according to some embodiments of the disclosure.
Figure 12B:
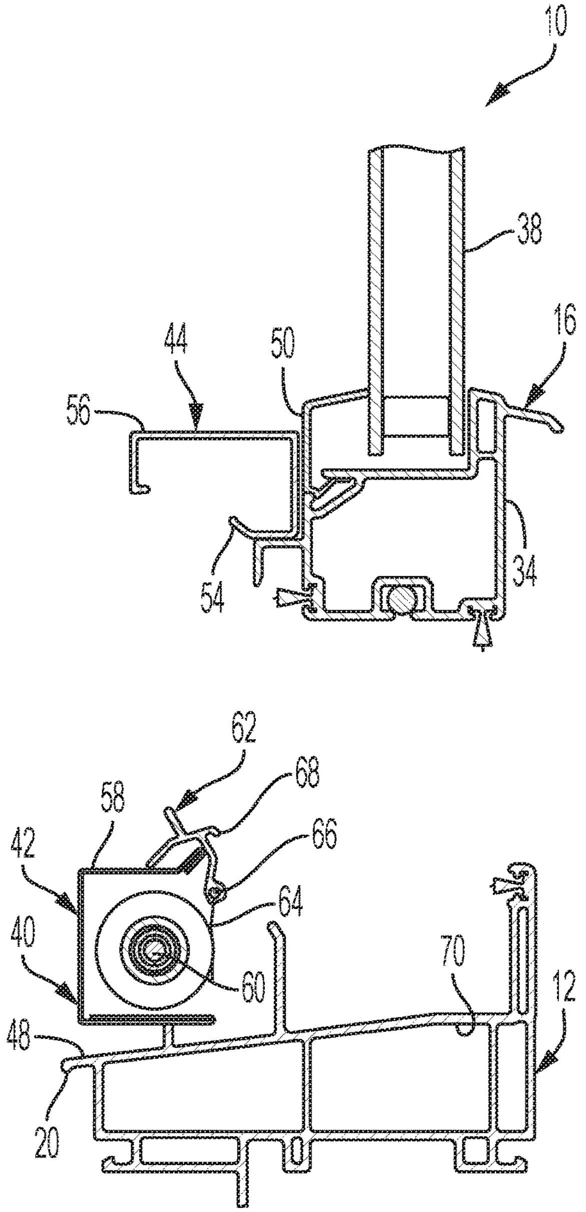

FIGS. 12A and 12B are schematic side cross-sectional views of the lower sash 16 and the retractable screen system 40 of FIGS. 8-11 in a closed configuration and in an open configuration when the at last one lever 82 engages the at least one linear cam 80, according to some embodiments of the disclosure. FIG. 12A shows the lower sash 16 in the closed configuration with the control bar 62 moved away from the lower sash 16 and the catch element 54 because the at least one lever 82 has been slid along the control bar 62 and pushed against the at least one linear cam 80, as described above. FIG. 12B shows the lower sash 16 in an open configuration. As shown in FIG. 12B, the control bar 62 is moved away from the catch element 54 so that the hook element 68 does not automatically engage the catch element 54 as the lower sash 16 transitions from the closed configuration to the open configuration. Thus, consideration FIGS. 8-12B together, in this way, the at least one lever 82 is configured to selectively engage the at least one linear cam 80 to move the control bar 62 away from the catch element 54 to prevent the hook element 68 from automatically engaging the catch element 54 when the lower sash 16 transitions from the closed configuration to the open configuration.

Considering FIGS. 1-6B together, the retractable screen system 40 may be fitted to the fenestration assembly 10 by coupling the pair of edge rails 46 (or the pair of edge rails 47) to the outer surfaces 52 of the jambs 22 on opposing sides of the frame 12. The screen assembly 42 may be coupled to the outer surface 48 of the sill 20 and/or the jambs 22 such that the control bar 62 projects into each of the rail slots 72. The catch assembly 44 may be coupled to the outer surface 50 of the lower rail 34 such that the catch element 54 automatically engages the hook element 68 and the screen material 64 unwinds from the roller assembly 60 as the lower sash 16 slides away from the roller assembly 60 and winds around the roller assembly 60 as the lower sash 16 slides toward the roller assembly 60. Additionally considering FIGS. 7A and 7B, fitting the retractable screen system 40 to the fenestration assembly 10 may further include configuring the hook element 68 and the catch element 54 such that the hook element 68 automatically disengages from the catch element 54 as the lower sash 16 is tilted out of the plane P formed by the frame 12. Additionally considering FIGS. 8-12B together, fitting the retractable screen system 40 to the fenestration assembly 10 may further include coupling the at least one linear cam 80 to the control bar 62 and coupling the at least one lever 82 to the frame 12 between the control bar 62 and the lower sash 16, the at least one lever 82 configured to selectively engage the at least one linear cam 80 to move the control bar 62 away from the catch element 54 to prevent the hook element 68 from automatically engaging the catch element 54 as the lower sash 16 slides away from the roller assembly 60.

Figure 13:
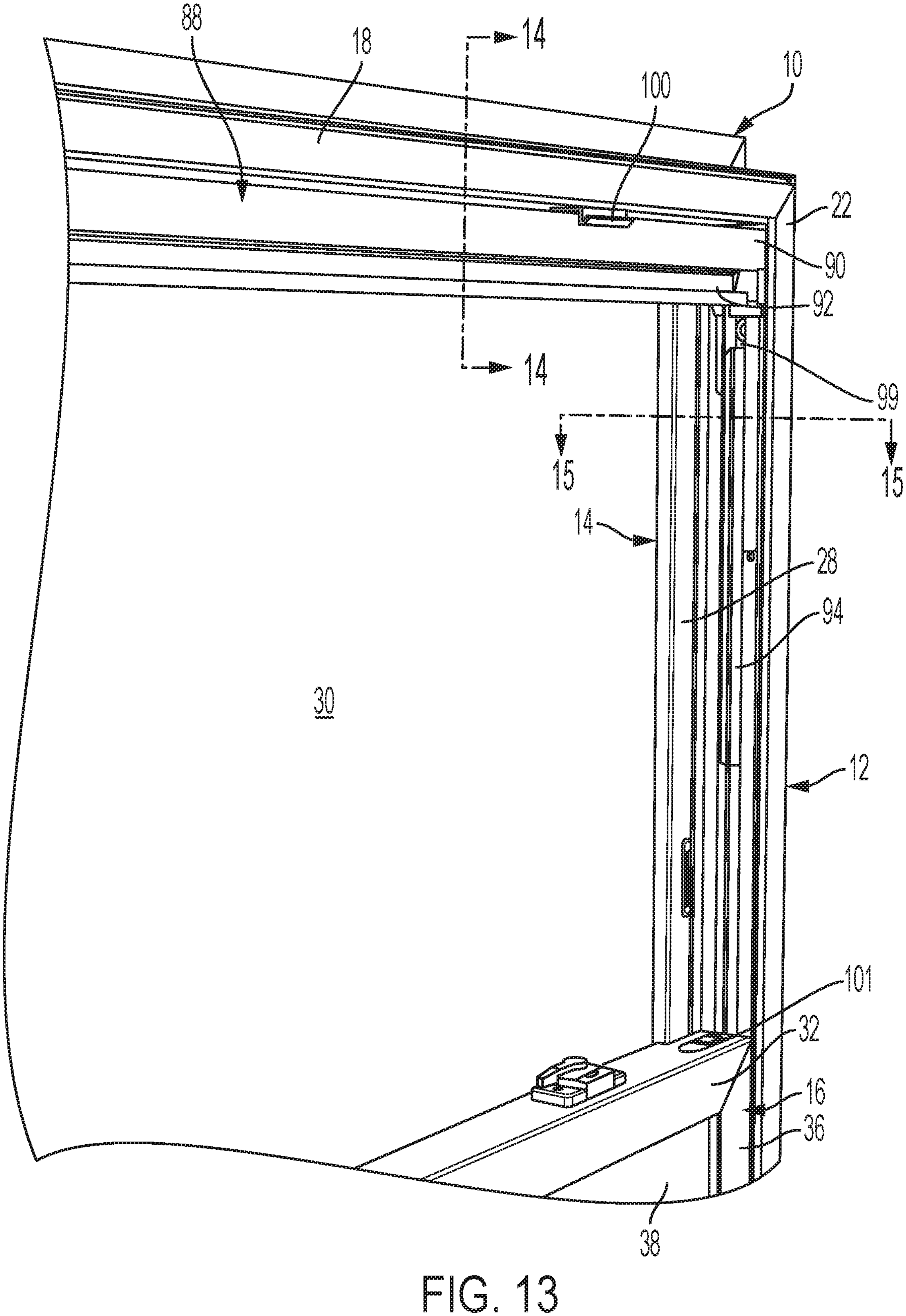
FIG. 13 is an interior perspective view of an upper portion of the fenestration assembly of FIG. 1 including another retractable screen system, according to some embodiments of this disclosure.

FIG. 13 is an interior perspective view of an upper portion of the fenestration assembly 10 of FIG. 1 including another retractable screen system 88, according to some embodiments of this disclosure. The embodiments illustrated by FIGS. 1-12B are suitable for the lower sash 16 of either a single-hung window or a double-hung window. The embodiment of FIG. 13 is suitable for the upper sash 14 of a double-hung window. FIG. 13 shows the retractable screen system 88 including a screen assembly 90, a catch assembly 92, and a pair of edge rails 94 (one shown in FIG. 13). The screen assembly 90 is coupled to an interior outer surface of the frame 12, specifically an outer surface of each of the two jambs 22 on opposite sides of the frame 12 near an outer surface 96 (shown in FIG. 14) of the top portion, or head 18. The catch assembly 92 is coupled to an outer surface of the upper sash 14, specifically an outer surface 98 (shown in FIG. 14) of the upper rail 24. Each of the two edge rails 94 is coupled to an outer surface 99 of each of the two jambs 22 on opposite sides of the frame 12. The screen assembly 90, the catch assembly 92 and the pair of edge rails 94 are coupled to the outer surfaces of the fenestration assembly 10 by any means known in the art, such as any of the methods described above for corresponding assemblies in reference to FIG. 2. The retractable screen system 88 further includes at least one slider 100. As also shown in FIG. 13, the lower sash 16 further includes a pair of tilt latches 101 (one shown in FIG. 13) to lock the lower sash 16 in place and prevent the lower sash 16 from tilting unless the tilt latches 101 are moved away from the jambs 22, as explained below in reference to FIG. 15.

Figure 14:
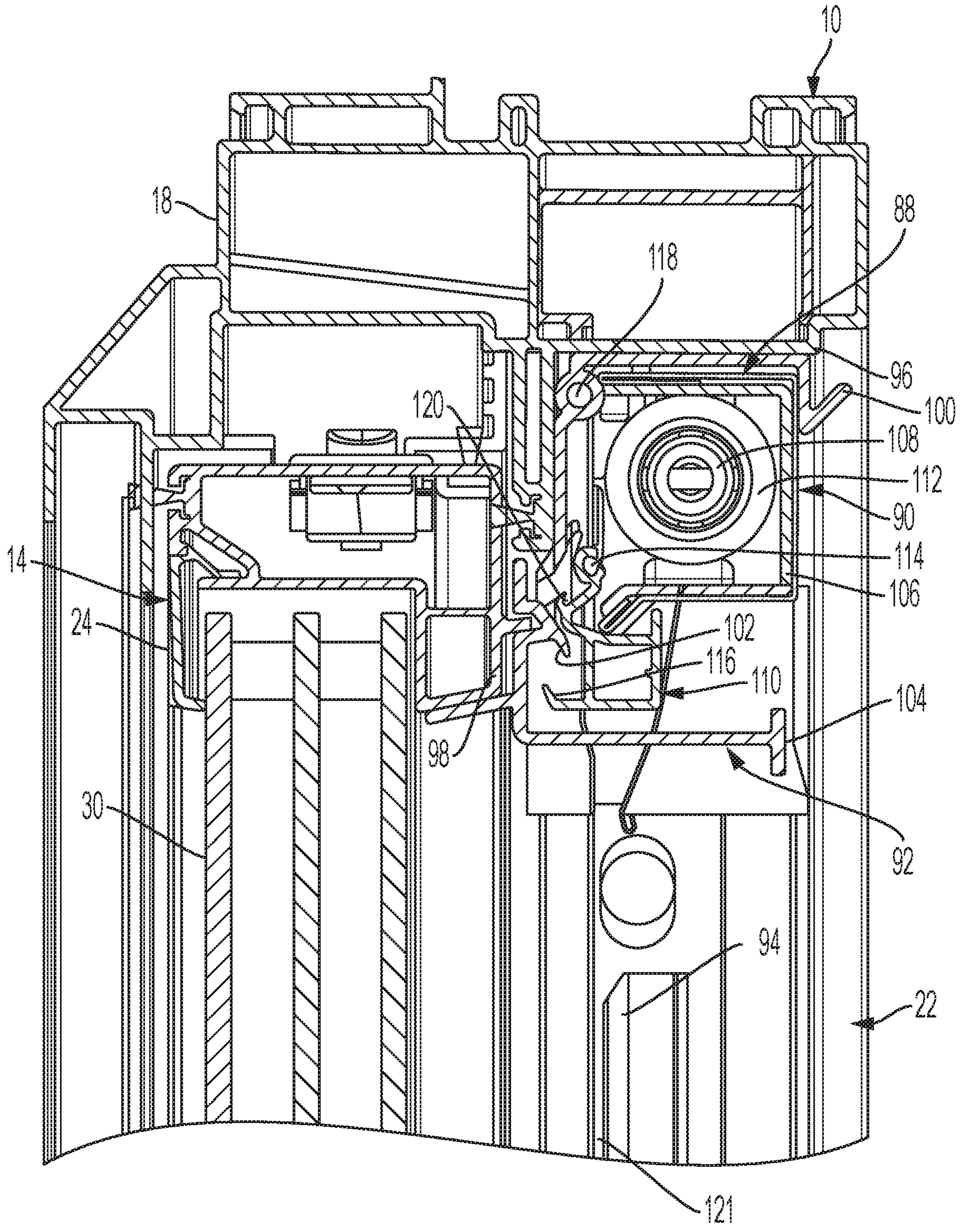
FIG. 14 is a side cross-sectional view of the fenestration assembly of FIG. 13 showing the upper sash and the retractable screen system, according to some embodiments of this disclosure.

FIG. 14 is a side cross-sectional view of the fenestration assembly of FIG. 13 showing the upper sash 14 and the retractable screen system 88, according to some embodiments of this disclosure. As shown in FIG. 14, the catch assembly 92 includes a catch element 102 and, optionally, a hood element 104. The screen assembly 90 includes a roller housing 106, a roller assembly 108, a control bar 110, and screen material 112 having an end 114.

The catch element 102 can be a hooked-shaped structure projecting from the upper rail 24 of the upper sash 14 and curving downward away from the roller assembly 108. The hood element 104 projects from the upper rail 24 of the upper sash 14 and extends beyond the control bar 110. In some embodiments, the catch assembly 92 may be a single integrated structure incorporating the catch element 102 and the hood element 104, as shown in FIG. 14. In some embodiments, the catch assembly 92 may extend along substantially the entire length of the upper sash 14.

The roller housing 106 can be a hollow structure extending substantially the width of the upper sash 14. The roller assembly 108 can be substantially similar to the roller assembly 60 described above. The control bar 110 can include a hook element 116. The control bar 110 can extend at least the width of the upper sash 14. The hook element 116 can be a hooked-shaped structure projecting toward the upper sash 14 from the control bar 110 and curving upward toward the roller assembly 108. The hook element 116 can extend along at least a portion of the control bar 110. In some embodiments, the hook element 116 may extend along substantially the entire length of the control bar 110. So configured, the hook element 116 can selectively engage the catch element 102, as described above in reference to FIGS. 6A and 6B for hook element 68 and catch element 54. The screen material 112 can be a polymer mesh and, in some embodiments, include a polymer coating. For example, in some embodiments, the screen material 112 can be a fiberglass mesh coated with polyvinyl chloride.

The catch assembly 92 may be made of a metal, such as aluminum, or a polymer, such as polyvinyl chloride, for example and may be formed by extrusion. The roller housing 106 may be formed by extrusion or by rolling or folding a sheet of a metal, such as aluminum, or a polymer, such as polyvinyl chloride, for example. The control bar 110 may be formed by extrusion of a metal, such as aluminum, for example.

The control bar 110 can be attached to the end 114 of the screen material 112 by any of the means describe above for the attachment of the control bar 62 to the end 66 of the screen material 64. Another end (not shown) of the screen material 112 opposite the end 114 of the screen material 112 can be attached to the roller assembly 108.

The slider 100 is connected to a connecting rod 118, which is connected to at least one lever (not shown) substantially similar to the lever 82 described above in reference to FIGS. 8-11. The control bar 110 includes at least one linear cam (not shown) substantially similar to the linear cam 80 described above in reference to FIGS. 8-11. Sliding the slider 100 automatically slides at least one lever along the control bar 110 due to a rigid connection provided by the connecting rod 118. As the lever slides along and parallel to the control bar 110, is contacts the linear cam attached to the control bar 110 to push the control bar 110 and the hook element 116 away from the upper sash 14. As with the embodiment of FIG. 11, the linear cam may be coupled to the control bar 110 by engaging a cam hook 120 as well as the portion of the control bar 110 that couples to the end 114 of the screen material 112. The cam hook 120 is disposed away from the hook element 116 such that the linear cam and the lever are not colinear with the hook element 116.

Similar to the embodiment shown in FIGS. 6A and 6B, the embodiment shown in FIGS. 13 and 14 may be in a closed configuration and an open configuration. In the closed configuration, the upper sash 14 is in contact with the head 18. In the open configuration, the upper sash 14 is not in contact with the head 18. When the upper sash 14 is in the closed configuration, the control bar 110 is in contact with, and held in position by, the roller housing 106 and the tension applied by the rotational bias of the roller assembly 108; the hook element 116 does not engage the catch element 102; and substantially all of the screen material 112 is coiled around the roller assembly 108. The surfaces of the roller housing 106 and the control bar 110 where they contact each other are configured such that the tension applied by the rotational bias of the roller assembly 108 forces the hook element 116 of the control bar 110 toward the catch element 102 of the catch assembly 92. As the upper sash 14 is lowered and slides away from the roller assembly 108, the upper sash 14 transitions from the closed configuration into the open configuration. As the upper sash 14 transitions from the closed configuration into the open configuration, the catch element 102 comes into contact with the hook element 116, at which point the hook element 116 automatically engages the catch element 102 and moves the control bar 110 out of contact with the roller housing 106. As the upper sash 14 continues to slide away from the roller assembly 108, tension is applied to the end 114 of the screen material 112 to cause the screen material 112 to unwind from the roller assembly 108. The tension can draw the screen material 112 taut as it extends between the roller assembly 108 and the upper rail 24 of the upper sash 14.

As additional tension is applied to the end 114 of the screen material 112 by moving the upper sash 14 away from the roller assembly 108, the screen material 112 continues to unwind from the roller assembly 108 against the rotational bias of the roller assembly 108. Conversely, as the tension applied to the end 114 of the screen material 112 is reduced by moving the upper sash 14 toward the roller assembly 108, the rotational bias of the roller assembly 108 winds the screen material 112 around the roller assembly 108. The upper sash 14 can be moved vertically within the frame 12 to open or close an area of the fenestration assembly 10 and extend or retract the screen material 112. The upper sash 14 can be moved fully upward to be in contact with the head 18 in the closed configuration, closing the area of fenestration assembly 10 between the upper sash 14 and the head 18 and retracting the screen material 112 into the roller assembly 108, bringing the control bar 110 into contact with the roller housing 106. In the closed configuration, the screen material 112 does not obscure the view through the window pane 30. Also, the retracted screen material 112 is protected from damage by the roller housing 106 when not in use. In some embodiments, the hood element 104 may also protect portions of the screen assembly 90 as well as provide for a more aesthetically pleasing appearance. In the open configuration, the screen material 112 does not cover the upper sash 14, unlike a conventional full screen, which provides for an improved aesthetic appearance of the fenestration assembly 10.

Similar to the embodiment shown in FIGS. 7A and 7B, the embodiment shown in FIGS. 13 and 14 may be tilted out of plane by rotating the upper sash 14 around a pivot point for ease of maintenance, for example. Tilting the upper sash 14 causes the hook element 116 to disengage from the catch element 102. Once the hook element 116 is disengaged from the catch element 102, the tension applied to the end 114 of the screen material 112 is eliminated and the rotational bias of the roller assembly 108 winds the screen material 112 around the roller assembly 108 and pulls the control bar 110 back into contact with the roller housing 106.

Once maintenance is completed, the upper sash 14 may be tilted back and moved upward toward the head 18 to the closed configuration. As the upper sash 14 is raised, the hook shape of the catch element 102 pushes the control bar 110 away from the upper sash 14, permitting the catch element 102 to pass by the control bar 110 without engaging the hook element 116. Once the catch element 102 moves past the hook element 116, the tension applied to the end 114 of the screen material 112 pulls the control bar 110 back toward the upper sash 14 so that the hook element 116 is automatically positioned to engage the catch element 102 when the upper sash 14 is again lowered and slid away from the roller assembly 108.

Similar to the embodiment shown in FIGS. 12A and 12B, the embodiment shown in FIGS. 13 and 14, sliding the slider bar 100 automatically slides at least one lever along the control bar 110 to contact the at least one linear cam attached to the control bar 110 to push the control bar 110 and the hook element 116 away from the upper sash 14. So configured, the hook element 116 does not automatically engage the catch element 102 as the upper sash 14 transitions from the closed configuration to the open configuration.

Figure 15:
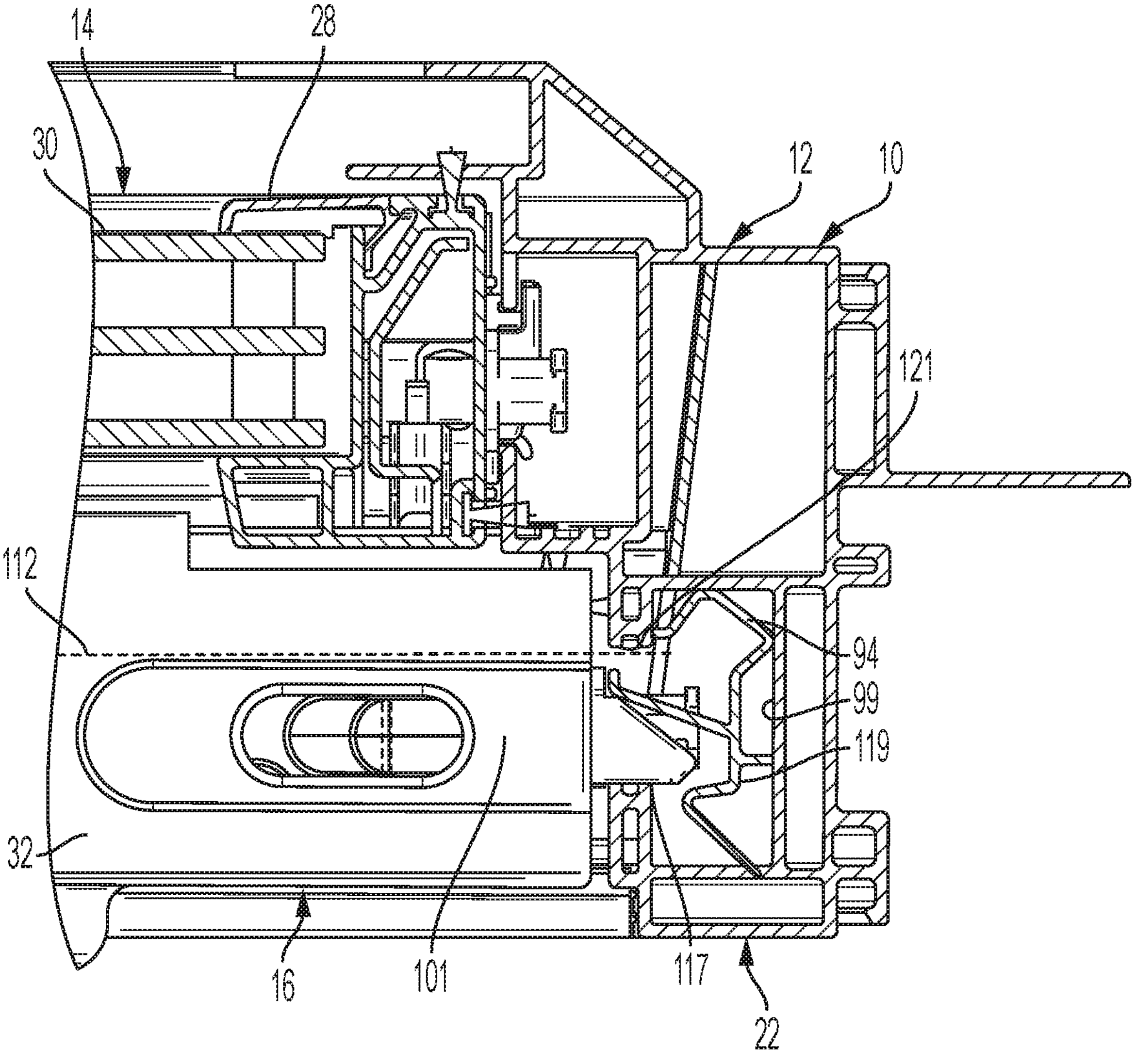
FIG. 15 is a top cross-sectional view of a portion of the fenestration assembly of FIG. 13, showing one of the jambs, the upper sash and the retractable screen system, according to some other embodiments of the disclosure.

FIG. 15 is a top cross-sectional view of a portion of the fenestration assembly 10 of FIG. 13, showing one of the jambs 22, the upper sash 14 and a portion of the retractable screen system 88, according to some other embodiments of the disclosure. As shown in FIG. 15, the tilt latch 101 is slid toward the jamb 22 so that a portion of the tilt latch 101 nearest the jamb 22 engages a tilt latch slot 117 to lock the lower sash 16 in place and prevent the lower sash 16 from tilting. The tilt latch slot 117 is a slot extend along a portion of the jamb 22 and can be formed by an insert 119 pressed into a balance pocket that forms the outer surface 99, as shown in FIG. 15. The insert 119 may also be referred to as a balance pocket cover. Sliding the tilt latch 101 away from the jamb 22 moves portion of the tilt latch 101 nearest the jamb 22 out of the tilt latch slot 117 to release the lower sash 16 so that it can be tilted for cleaning, for example. unless the tilt latches 101 are moved away from the jambs 22. In the embodiment of FIG. 15, the insert 119 further serves to form the edge rail 94 is coupled to the outer surface 99 of each of the two jambs 22. The edge rail 94 forms a rail slot 121 to contain the edge of the screen material 112. Thus, the insert 119 provides both the tilt latch slot 117 and the rail slot 121. In some embodiments, the control bar 110 (FIG. 14) projects into each of the rails slots 121 to guide the screen material 112 through the rail slots 112.

Figure 16:
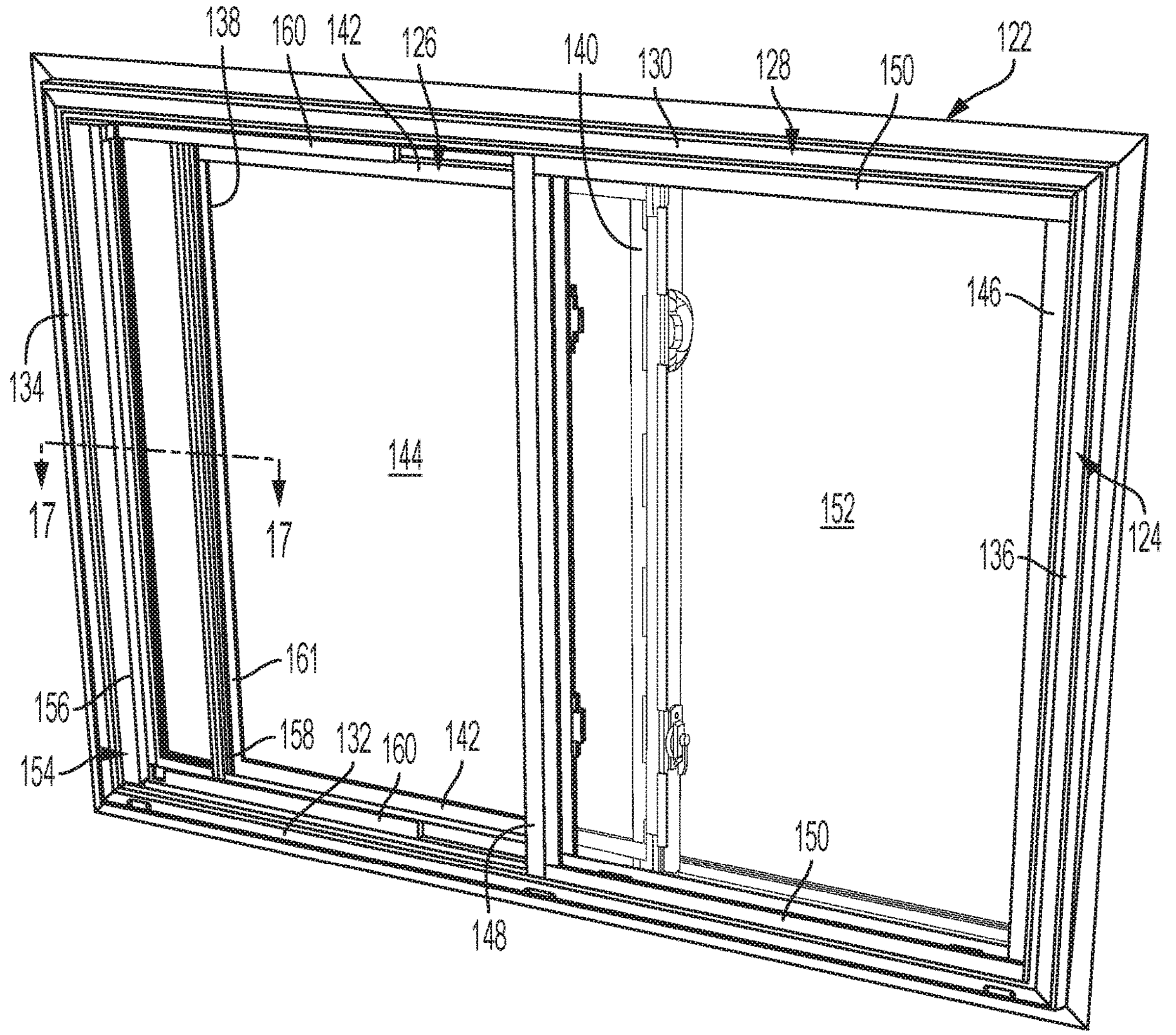
FIG. 16 an exterior perspective view of another fenestration assembly including a retractable screen system, according to some embodiments of this disclosure.

FIG. 16 an exterior perspective view of another fenestration assembly including a retractable screen system, according to some embodiments of this disclosure. FIG. 16 shows a fenestration assembly 122 is horizontally sliding window that includes a frame 124, a first sash 126 and a second sash 128. The frame 124 can include a top portion, or head 130, a bottom portion, or sill 132, a first jamb 134 and a second jamb 136. Together, the head 130, the sill 132, the first jamb 134 and the second jamb 136 surround and support the first sash 126 and the second sash 128. In some embodiments, the second sash 128 is fixed and the first sash 126 slidably engages with the head 130 and the sill 132. In some other embodiments, both the first sash 126 and the second sash 128 are slidably engaged with the head 130 and the sill 132. The first sash 126 can include a first stile 138, a second stile 140, two rails 142, and window pane 144. Together, the first stile 138, the second stile 140 and the rails 142 surround and support the window pane 144. The second sash 128 can include a first stile 146, a second stile 148, two rails 150, and window pane 152. Together, the first stile 146, the second stile 148 and the rails 150 surround and support the window pane 152.

As shown in FIG. 16, the fenestration assembly 122 further includes a retractable screen system 154 including a screen assembly 156, a catch assembly 158, and a pair of edge rails 160. The screen assembly 156 is coupled to an outer surface of the frame 124, specifically on outer surfaces of the head 130 and the sill 132 near the first jamb 134. The catch assembly 158 is coupled to an outer surface of the first sash 126, specifically an outer surface 161 of the first stile 138. As shown in FIG. 16, each of the two edge rails 160 is coupled to an outer surface of the frame 124, specifically on outer surfaces of the rails 142. The edge rails 160 may be similar to the edge rail 46 described above and form a rail slot 72. The screen assembly 156, the catch assembly 158 and the pair of edge rails 160 are coupled to the outer surfaces of the fenestration assembly 122 by any means known in the art, such as by mechanical fasteners, such as screws, bolts, rivets or nails, for example, by a mechanical interlocking of parts, or by one or more adhesive fasteners, such as a silicone adhesive, an epoxy adhesive, a polyurethane adhesive, or by an acrylic adhesive foam tape, for example, or by any combination of coupling means. For example, in some embodiments, the screen assembly 156 is coupled the head 130 and the sill 132 by endcaps (not shown) that engage grooves in the head 130 and the sill 132 that would normally retain a standard flat screen, the catch assembly 158 is mounted to the outer surface of the first stile 138 by an acrylic foam tape that consists of layers of acrylic tape on each side of a thin layer of foam, and each of the two edge rails 160 is coupled to each of the two rails 142 by the acrylic foam tape.

Figure 17:
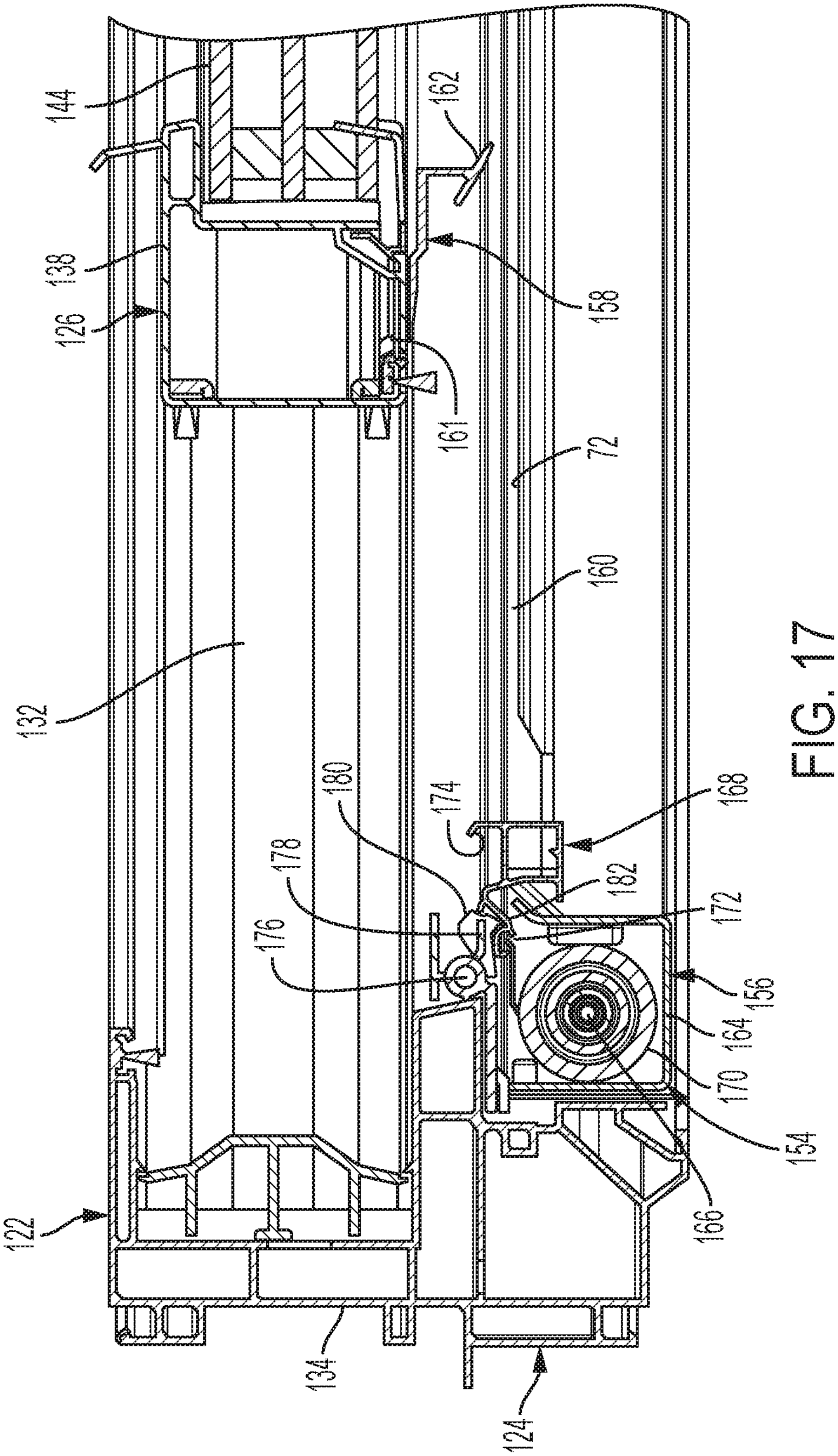
FIG. 17 is a top cross-sectional view of the fenestration assembly of FIG. 16 showing the first sash and the retractable screen system, according to some embodiments of this disclosure.

FIG. 17 is a top cross-sectional view of the fenestration assembly of FIG. 16 showing the first sash 126 and the retractable screen system 154, according to some embodiments of this disclosure. As shown in FIG. 17, the catch assembly 158 includes a catch element 162. The screen assembly 156 includes a roller housing 164, a roller assembly 166, a control bar 168, and screen material 170 having an end 172. The catch element 162 can be a hooked-shaped structure projecting from the first stile 138 of the first sash 126 and curving away from the roller assembly 166. In some embodiments, the catch assembly 158 may extend along substantially the entire length of the first stile 138.

The roller housing 164 can be a hollow structure extending substantially the length of the first stile 138. The roller assembly 166 can be substantially similar to the roller assembly 60 described above. The control bar 168 can include a hook element 174. The control bar 168 can extend at least the length of the first stile 138. The hook element 174 can be a hooked-shaped structure projecting toward the first stile 138 from the control bar 168 and curving toward the roller assembly 166. The hook element 174 can extend along at least a portion of the control bar 168. In some embodiments, the hook element 174 may extend along substantially the entire length of the control bar 168. So configured, the hook element 174 can selectively engage the catch element 162, as described above in reference to FIGS. 6A and 6B for hook element 68 and catch element 54. The screen material

170 can be a polymer mesh and, in some embodiments, include a polymer coating. For example, in some embodiments, the screen material 170 can be a fiberglass mesh coated with polyvinyl chloride. The catch assembly 158, the roller housing 164 and the control bar 168 may be formed as for the corresponding elements in other embodiments described above.

The control bar 168 can be attached to the end 172 of the screen material 170 by any of the means describe above for the attachment of the control bar 62 to the end 66 of the screen material 64. Another end (not shown) of the screen material 170 opposite the end 172 of the screen material 170 can be attached to the roller assembly 166.

A connecting rod 176 connects at least two levers 178 (one shown) substantially similar to the lever 82 described above in reference to FIGS. 8-11. The control bar 168 includes at least two linear cams 180 (one shown) substantially similar to the linear cam 80 described above in reference to FIGS. 8-11. Sliding one of the levers 178 automatically slides the other lever 178 along the control bar 168 due to a rigid connection provided by the connecting rod 176. As the two levers 178 slide along and parallel to the control bar 168, they contact the two linear cams 180 attached to the control bar 168 to push the control bar 168 and the hook element 174 away from the first stile 138. As with the embodiment of FIG. 11, the linear cams 180 may be coupled to the control bar 168 by engaging a cam hook 182 as well as the portion of the control bar 168 that couples to the end 172 of the screen material 170. The cam hook 182 is disposed away from the hook element 174 such that the linear cams 180 and the levers 178 are not colinear with the hook element 174.

Similar to the embodiment shown in FIGS. 6A and 6B, the embodiment shown in FIGS. 15 and 16 may be in a closed configuration and an open configuration. When the first sash 126 is in the closed configuration, the first stile 138 is in contact with the first jamb 134. When the first sash 126 is in the open configuration, the first stile 138 is not in contact with the first jamb 134. When the first sash 126 is in the closed configuration, the control bar 168 is in contact with, and held in position by, the roller housing 164 and the tension applied by the rotational bias of the roller assembly 166; the hook element 174 does not engage the catch element 162; and substantially all of the screen material 170 is coiled around the roller assembly 166. The surfaces of the roller housing 164 and the control bar 168 where they contact each other are configured such that the tension applied by the rotational bias of the roller assembly 166 forces the hook element 174 of the control bar 168 toward the catch element 162 of the catch assembly 158. As the first sash 126 is slid away from the roller assembly 166, the first sash 126 transitions from the closed configuration into the open configuration. As the first sash 126 transitions from the closed configuration into the open configuration, the catch element 162 comes into contact with the hook element 174, at which point the hook element 174 automatically engages the catch element 162 and moves the control bar 168 out of contact with the roller housing 164. As the first sash 126 continues to slide away from the roller assembly 166, tension is applied to the end 172 of the screen material 170 to cause the screen material 170 to unwind from the roller assembly 166. The tension can draw the screen material 170 taut as it extends between the roller assembly 166 and the first stile 138 of the first sash 126.

As additional tension is applied to the end 172 of the screen material 170 by moving the first sash 126 away from the roller assembly 166, the screen material 170 continues to unwind from the roller assembly 166 against the rotational bias of the roller assembly 166. Conversely, as the tension applied to the end 172 of the screen material 170 is reduced by moving the first sash 126 toward the roller assembly 166, the rotational bias of the roller assembly 166 winds the screen material 170 around the roller assembly 166. The first sash 126 can be moved horizontally within the frame 124 to open or close an area of the fenestration assembly 122 and extend or retract the screen material 170. The first sash 126 can be moved to be in contact with the first jamb 134 in the closed configuration, closing the area of fenestration assembly 122 between the first sash 126 and the first jamb 134 and retracting the screen material 170 into the roller assembly 166, bringing the control bar 168 into contact with the roller housing 164. In the closed configuration, the screen material 170 does not obscure the view through the window pane 144. Also, the retracted screen material 112 is protected from the elements by the roller housing 164 when not in use, reducing the opportunity for the accumulation of detritus on the screen material 170. In the open configuration, the screen material 170 does not cover the first sash 126, unlike a conventional full screen, which provides for an improved aesthetic appearance of the fenestration assembly 122.

Similar to the embodiment shown in FIGS. 12A and 12B, the embodiment shown in FIGS. 16 and 17, sliding one of the levers 178 automatically slides the other lever 178 along the control bar 168 to contact the two linear cams 180 attached to the control bar 168 to push the control bar 168 and the hook element 174 away from the first stile 138. So configured, the hook element 174 does not automatically engage the catch element 162 as the first sash 126 transitions from the closed configuration to the open configuration.

Considering FIGS. 16 and 17 together, the retractable screen system 154 may be fitted to the fenestration assembly 122 by coupling the pair of edge rails 160 to the outer surfaces of the head 130 and the sill 132 on opposing sides of the frame 124. The screen assembly 156 may be coupled to the outer surface 48 of the first jamb 134 and/or the head 130 and the sill 132 such that the control bar 168 projects into each of the rail slots 72. The catch assembly 158 may be coupled to the outer surface 161 of the first stile 138 such that the catch element 162 automatically engages the hook element 174 and the screen material 170 unwinds from the roller assembly 166 as the first sash 126 slides away from the roller assembly 166 and winds around the roller assembly 166 as the first sash 126 slides toward the roller assembly 166. Additionally, fitting the retractable screen system 154 to the fenestration assembly 122 may further include coupling the at least one linear cam 180 to the control bar 168 and coupling the at least one lever 178 to the frame 124 between the control bar 168 and the first sash 126, the at least one lever 178 configured to selectively engage the at least one linear cam 180 to move the control bar 168 away from the catch element 162 to prevent the hook element 174 from automatically engaging the catch element 162 as the first sash 126 slides away from the roller assembly 166.

Retractable screen systems according to embodiments of this disclosure may be readily applied to an existing fenestration assembly design because all elements of the retractable screen systems are coupled to easily accessible outer surfaces. Single-hung, double-hung and horizontally sliding windows already installed in the field may be easily retrofitted with the retractable screen systems described above. The retractable screen systems may be applied in the production of existing fenestration assemblies without the need to change the existing design.

As shown in FIGS. 1-17, in some embodiments, the retractable screen system may be retrofitted to an existing window or applied to an existing window design without projecting beyond the frame. This provides for a more an aesthetically pleasing appearance than prior art systems that project beyond the frame.

Various modifications and additions can be made to the examples discussed without departing from the scope of the present disclosure. For example, while the examples described above refer to particular features, the scope of this disclosure also includes examples having different combinations of features and examples that do not include all of the above described features.

I claim:

1. A retractable screen system for a fenestration assembly including a sash slidably engaged with a frame of the fenestration assembly, the system comprising:

a catch assembly configured to couple to an outer surface of the sash, the catch assembly comprising a catch element;

a pair of edge rails, each edge rail of the pair of edge rails forming a rail slot and configured to couple to opposite sides of the frame; and a screen assembly comprising:

a roller housing configured to couple to an outer surface of the frame;

a roller assembly disposed within the roller housing and substantially hidden from view;

a control bar configured to project beyond the sash and into each of the rail slots, the control bar comprising a hook element extending along at least a portion of the control bar, the hook element configured to selectively engage the catch element; and screen material coupled to the roller assembly, edges of the screen material projecting into each of the rail slots and an end of the screen material coupled to the control bar; the roller assembly configured to apply tension to the screen material to wind the screen material around the roller assembly and to permit the screen material to unwind from the roller assembly under a tension applied by moving the catch assembly away from the roller assembly when the hook element engages the catch element, wherein the catch assembly is operable to rotate away from the control bar of the screen assembly when the sash is rotated out-of-plane, and wherein the hook element is configured to automatically disengage from the catch element as the catch assembly is tilted.

2. The system of claim 1, wherein the catch assembly further includes a hood element configured to project away from the sash and beyond the control bar.

3. The system of claim 1, wherein the control bar further comprises at least one linear cam and the system further comprises at least one lever configured to selectively engage the at least one linear cam to move the control bar away from the catch element to prevent the hook element from engaging the catch element.

4. The system of claim 3, wherein the at least one lever is configured to selectively engage the at least one linear cam by sliding in a direction parallel to the control bar.

5. The system of claim 3, wherein the at least one linear cam consists of two linear cams spaced apart along the control bar, and the at least one lever consists of two levers coupled by a connecting rod and configured to selectively engage the two linear cams at the same time.

6. The system of claim 1, wherein the system is configured to not project beyond the frame.

7. The system of claim 1, wherein each edge rail of the pair of edge rails comprises an outer edge rail and an inner edge rail, the inner edge rail in telescoping engagement with the outer edge rail.

8. A fenestration assembly comprising:

at least one sash comprising:

a first rail;

a second rail opposite the first rail;

two stiles connecting the first rail to the second rail; and a window pane surrounded by the first rail, the second rail, and the two stiles;

a frame surrounding the at least one sash, the frame including:

a first portion;

a second portion opposite the first portion; and two jambs connecting the first portion to the second portion, the at least one sash slidably engaged with the two jambs between an open configuration in which the first rail of the at least one sash is not in contact with the first portion or the second portion, and a closed configuration in which the first rail of the at least one sash is in contact with the first portion or the second portion; and at least one retractable screen system comprising:

a pair of edge rails coupled to the two jambs on opposite sides of the frame, each of the pair of edge rails forming a rail slot;

a catch assembly coupled to an outer surface of the first rail, the catch assembly comprising a catch element; and a screen assembly comprising:

a roller housing coupled to an outer surface of the first portion;

a roller assembly disposed within the roller housing and substantially hidden from view;

a control bar projecting beyond the at least one sash and into each of the rail slots, the control bar comprising a hook element extending along at least a portion of the control bar, the hook element configured to selectively engage the catch element; and screen material coupled to the roller assembly, edges of the screen material projecting into each of the rail slots and an end of the screen material coupled to the control bar; the roller assembly configured to apply tension to the screen material to wind the screen material around the roller assembly and to permit the screen material to unwind from the roller assembly when the hook element engages the catch element as the at least one sash slides away from the roller assembly, wherein the hook element automatically engages the catch element when the at least one sash transitions from the closed configuration to the open configuration, wherein the catch assembly is operable to rotate away from the control bar of the screen assembly when the at least one sash is rotated out-of-plane, and wherein the at least one sash is configured to tilt out of a plane formed by the frame, automatically disengaging the hook element from the catch element.

9. The fenestration assembly of claim 8, wherein the catch assembly further includes a hood element configured to project from the at least one sash and extend beyond the control bar.

10. The fenestration assembly of claim 8, wherein the control bar further comprises at least one linear cam and the at least one retractable screen system further comprises at least one lever disposed between the control bar and the at least one sash, the at least one lever configured to selectively engage the at least one linear cam to:

move the control bar away from the catch element to prevent the hook element from automatically engaging the catch element when the at least one sash transitions from the closed configuration to the open configuration; and permit the control bar to move toward the catch element to allow the hook element to automatically re-engage the catch element as the at least one sash transitions from the open configuration to the closed configuration.

11. The fenestration assembly of claim 10, wherein the at least one lever is configured to selectively engage the at least one linear cam by sliding in a direction parallel to the control bar.

12. The fenestration assembly of claim 11, wherein the at least one linear cam includes two linear cams spaced apart along the control bar, and the at least one lever includes two levers coupled by a connecting rod and configured selectively engage the two linear cams at about the same time.

13. The fenestration assembly of claim 8, wherein the at least one retractable screen system does not project beyond the frame.

14. The fenestration assembly of claim 8, wherein the at least one sash includes a lower sash, the first rail of the at least one sash is a lower rail of the lower sash, the first portion of the frame is a bottom portion of the frame, the at least one retractable screen system includes a lower retractable screen system, the catch assembly of the lower retractable screen system is coupled to an exterior outer surface of the lower rail of the lower sash, and the roller housing of the lower retractable screen system is coupled to an exterior outer surface of the bottom portion of the frame, the lower rail of the lower sash in contact with the bottom portion of the frame in the closed configuration and not in contact with the bottom portion of the frame in the open configuration.

15. The fenestration assembly of claim 14, wherein the at least one sash further includes an upper sash, the first rail of the upper sash is an upper rail of the upper sash, the second portion of the frame is a top portion of the frame, the at least one retractable screen system further includes an upper retractable screen system, the catch assembly of the at least one retractable screen system is part of the upper retractable screen system and is coupled to an interior outer surface of the upper rail of the upper sash, and the roller housing of the upper retractable screen system is coupled to an interior outer surface of the top portion of the frame, the upper rail of the upper sash in contact with the top portion of the frame in the closed configuration and not in contact with the top portion of the frame in the open configuration.

16. A method for fitting a retractable screen system to a fenestration assembly, the fenestration assembly including a sash and a frame surrounding the sash, the method comprising:

coupling a pair of edge rails to outer surfaces of jambs on opposing sides of the frame, each of the edge rails forming a rail slot;

coupling a screen assembly to an outer surface of a sill or a head of the frame such that a control bar of the screen assembly projects into each of the rail slots, the screen assembly including a roller assembly disposed within a roller housing and screen material coupled to the roller assembly and to the control bar;

coupling a catch assembly to an outer surface of a lower rail or an upper rail, respectively, of the sash such that a catch element of the catch assembly automatically engages a hook element of the control bar and the screen material unwinds from the roller assembly as the sash slides away from the roller assembly and winds around the roller assembly as the sash slides toward the roller assembly; and rotating the catch assembly away from the control bar of the screen assembly when the sash is rotated out-of-plane resulting in release of the screen assembly from the sash, wherein the hook element automatically disengages from the catch element as the sash is tilted out of a plane formed by the frame.

17. The method of claim 16, further comprising coupling at least one linear cam to the control bar and coupling at least one lever to the frame between the control bar and the sash, the at least one lever configured to selectively engage the at least one linear cam to move the control bar away from the catch element to prevent the hook element from automatically engaging the catch element as the sash slides away from the roller assembly.

* * * * *